US012782196B2

(12) United States Patent
Bischoff et al.

(10) Patent No.: US 12,782,196 B2

(45) Date of Patent: Nov. 3, 2026

(54) COLOR ADJUSTMENT METHODS AND SYSTEMS

(71) Applicant: BASF COATINGS GMBH, Muenster (DE)

(72) Inventors: Guido Bischoff, Muenster (DE); Carlos Vignolo, Wuerzburg (DE)

(73) Assignee: BASF COATINGS GMBH, Muenster (DE)

( * ) Notice: Subject to any disclaimer, the term of this patent is extended or adjusted under 35 U.S.C. 154(b) by 260 days.

(21) Appl. No.: 18/720,958

(22) PCT Filed: Jan. 9, 2023

(86) PCT No.: PCT/EP2023/050269

§ 371 (c)(1),
(2) Date: Jun. 17, 2024

(87) PCT Pub. No.: WO2023/135069

PCT Pub. Date: Jul. 20, 2023

(65) Prior Publication Data

US 2025/0052616 A1 Feb. 13, 2025

(30) Foreign Application Priority Data

Jan. 11, 2022 (EP) .................................... 22150933

(51) Int. Cl.
*G01J 3/46* (2006.01)
*G01J 3/02* (2006.01)

(52) U.S. Cl.
CPC ............. *G01J 3/463* (2013.01); *G01J 3/0264* (2013.01); *G01J 3/462* (2013.01); *G01J 2003/466* (2013.01)

(58) Field of Classification Search
CPC .......... G01J 3/463; G01J 3/0264; G01J 3/462; G01J 2003/466; G01J 3/027; G01J 3/28
See application file for complete search history.

(56) References Cited

U.S. PATENT DOCUMENTS 5,740,079 A 4/1998 Shigemori
9,830,429 B2 * 11/2017 Norris .................... G01J 3/463
(Continued)

FOREIGN PATENT DOCUMENTS

EP 2149038 B1 7/2018
JP H08247932 A 9/1996
(Continued)

OTHER PUBLICATIONS

Powell, "A Direct Search Optimization Method that Models the Objective and Constraint Functions by Linear Interpolation", S. Gomezx and J-P. Hennart (eds.), Advances in Optimization and Numerical Analysis, pp. 51-67 (1994).
(Continued)

*Primary Examiner* — Abdullahi Nur

(74) *Attorney, Agent, or Firm* — Armstrong Teasdale LLP

(57) ABSTRACT

Described herein are methods and systems for matching the color of a sample coating to the color of a reference coating. More specifically, described herein are methods and systems for determining an adapted modified sample coating formulation which, when applied onto a substrate, sufficiently matches the color of a reference coating by determining adjusted optical data for each individual color component present within the sample coating formulation and using the adjusted optical data to determine the modified sample coating formulation. Use of the adjusted optical data for each individual color component present within the sample coating formulation within the color adjustment process allows to compensate variations of colorant strength characteristics of colorants in paint production. The adjustment of the optical data allows to improve the quality and/or accuracy of the modified sample coating formulation, thus reducing the number of modification steps necessary to
(Continued)

obtain the desired color of the sample coating in relation to the reference coating.

20 Claims, 11 Drawing Sheets

(56) References Cited

U.S. PATENT DOCUMENTS

| | | | |
|---|---|---|---|
| 2014/0350867 | A1 | 11/2014 | Alspach et al. |
| 2015/0116346 | A1 | 4/2015 | Somerville et al. |
| 2021/0201494 | A1 | 7/2021 | Steenhoek et al. |

FOREIGN PATENT DOCUMENTS

| | | | | | |
|---|---|---|---|---|---|
| JP | 2003035598 | A | * | 2/2003 | |
| JP | 2003183544 | A | | 7/2003 | |
| JP | 2008170155 | A | | 7/2008 | |
| JP | 2018112563 | A | * | 7/2018 | .............. G01J 3/504 |
| WO | 2021023685 | A1 | | 2/2021 | |

OTHER PUBLICATIONS

International Search Report for PCT/EP2023/050269 dated Apr. 5, 2023, 4 pages.
Written Opinion for PCT/EP2023/050269 dated Apr. 5, 2023, 7 pages.

* cited by examiner

608

| Colorant | Amount [wt.%] |
|---|---|
| White | 99.95 |
| Black (100%) | 0.05 |

| Object | Illuminant | Layer | Geometry | L* | a* | b* | C* | H* |
|---|---|---|---|---|---|---|---|---|
| Target | D65 | 1 | 45 | 94.328 | -0.936 | 1.208 | 1.528 | 127.771 |

606

706'

| Object | Illuminant | Layer | Geometry | L* | a* | b* | C* | H* |
|---|---|---|---|---|---|---|---|---|
| Target | D65 | 1 | 45 | 94.328 | -0.936 | 1.208 | 1.528 | 127.771 |

708'

| Object | Illuminant | Layer | Geometry | L* | a* | b* | C* | H* |
|---|---|---|---|---|---|---|---|---|
| Match | D65 | 1 | 45 | 94.312 | -1.030 | 1.402 | 1.740 | 126.291 |

FIG. 7 continued

| Object | Illuminant | Layer | Geometry | L* | a* | b* | C* | H* |
|---|---|---|---|---|---|---|---|---|
| Match | D65 | 1 | 45 | 95.266 | -1.050 | 1.534 | 1.859 | 124.396 |

710'

| Object | Illuminant | Layer | Geometry | ΔE | ΔL* | Δa* | Δb* | ΔC* | ΔH* |
|---|---|---|---|---|---|---|---|---|---|
| Match | D65 | 1 | 45 | 1.000 | 0.939 | -0.114 | 0.326 | 0.331 | -0.099 |

712

| Colorant | Amount [wt.%] |
|---|---|
| White | 99.95 |
| Black (100%) | 0.13 |

714

| Object | Illuminant | Layer | Geometry | L* | a* | b* | C* | H* |
|---|---|---|---|---|---|---|---|---|
| Target | D65 | 1 | 45 | 94.328 | -0.936 | 1.208 | 1.528 | 127.771 |

| Object | Illuminant | Layer | Geometry | L* | a* | b* | C* | H* |
|---|---|---|---|---|---|---|---|---|
| Match | D65 | 1 | 45 | 94.346 | -0.937 | 1.212 | 1.532 | 127.715 |

FIG. 8 continued

| Object | Illuminant | Layer | Geometry | L* | a* | b* | C* | H* |
|---|---|---|---|---|---|---|---|---|
| Match | D65 | 1 | 45 | 94.346 | -0.936 | 1.211 | 1.531 | 127.721 |

808'

| Object | Illuminant | Layer | Geometry | ΔE | ΔL* | Δa* | Δb* | ΔC* | ΔH* |
|---|---|---|---|---|---|---|---|---|---|
| Match | D65 | 1 | 45 | 0.018 | 0.018 | -0.001 | 0.004 | 0.003 | -0.001 |

812

| Colorant | Amount [wt.%] |
|---|---|
| White | 99.95 |
| Black (20%) | 0.25 |

814

COLOR ADJUSTMENT METHODS AND SYSTEMS

CROSS-REFERENCE TO RELATED APPLICATIONS

This application is a U.S. National Phase Application of International Patent Application No. PCT/EP23/50269, filed Jan. 9, 2023, which claims priority to European Patent Application No. 22150933.4, filed Jan. 11, 2022, which is hereby incorporated by reference herein.

FIELD

Aspects described herein generally relate to methods and systems for adjusting the color of a sample coating to the color of a reference coating such that a sufficient color match is obtained. More specifically, aspects described herein relate to methods and systems for determining an adapted modified sample coating formulation which, when applied onto a substrate, sufficiently matches the color of a reference coating by determining adapted optical data for each individual color component present in the sample coating formulation and using said adapted optical data to determine the modified sample coating formulation. Use of the adapted optical data for each individual color component present in the sample coating formulation within the color adjustment process allows to compensate variations of colorant strength characteristics of colorants in paint production. The adaption of said optical data allows to improve the quality and/or accuracy of the adjusted sample coating formulation, thus reducing the number of adjustment steps necessary to obtain the desired color of the sample coating in relation to the reference coating.

BACKGROUND

A paint production process for a given color standard typically starts with an initial coating formulation, e.g. a formulation loaded from a database. The color of the initial coating formulation is obtained by adding at least one pigment paste (also called colorant hereinafter) to a base varnish containing binders, solvents and optionally additives. The pigment paste is an intermediate product containing a color imparting component (such as a pigment) in a matrix (typically a binder, solvents and optionally additives). Typically, the color of said intermediate products varies from batch to batch due to variations in the quality of the raw materials, such as pigments. To avoid adjusting the color of each produced pigment paste, the pigment pastes are used "as is" for the preparation of the initial coating formulation so that only the initial coating formulation has to be adjusted. The initial coating formulation normally comprises reduced amounts of pigment pastes (compared to the final paint formulation) to avoid that the produced coating batch becomes too dark because of overshooting colorant strength characteristics of one or more colorants present in the coating formulation. An initial coating batch is fabricated according to this initial coating formulation and the corresponding color of this coating batch is measured and compared with the reference color. Due to the reduced amounts of colorants, the first coating batch normally has a significant residual color difference compared to the reference coating. Thus, a color adjustment process must be applied to minimize the residual color difference between the color of the coating batch and the color of the reference coating as much as possible by modifying the initial coating formulation. A modified coating is then prepared from the modified initial coating formulation and the color of the modified coating is determined and compared to the color of the reference coating. In case it is not sufficiently matching, the color adjustment process has to be repeated with the adjusted initial coating formulation.

Most computer-aided color adjustment methods (also called color matching methods) are based on physical models which describe an interaction of light with scattering or absorbing media, e.g. with colorants in coating layers. Each coating layer has specific light reflectance properties due to the colorants present in said coating layer. Each of these colorants has specific optical properties which are expressed by respective optical constants or optical data. These optical constants describe e.g. the absorption and scattering properties of these colorants in the context of the physical model, like e.g. the K/S values in the well-known "Kubelka/Munk"-model. Physical models, like the "Kubelka/Munk"-model, can predict the light reflectance properties (color) of a coating layer based on information about the colorants present in said coating layer (based, for example, on information about the formulation used to prepare the coating layer) together with the corresponding optical properties or respective optical constants of the colorants.

The optical properties of colorants can be determined based on color data of existing reference coatings prepared from known coating formulations having known reflectance data. Thus, color predictions of a physical model as well as color matching processes always use the optical properties of colorants present within batches used to prepare the reference coatings (also called "reference colorant batches" hereinafter).

An appropriate formulation for a given reference color (or an appropriate color adjustment) can be predicted based on the physical model with existing optical constants of the colorants and with reflectance data of the reference coating as input parameters, using numerical optimization algorithms. However, the color prediction accuracy of a physical model is limited due to the presence of systematical and statistical errors. Statistical errors can be caused by the instrument used to determine the color or by the measurement process, e.g. variances of the position of the instrument on the sample. Systematical errors (also called model bias hereinafter) are defined as the difference between the measured color of the sample coating and the color of the sample coating predicted by the physical model. Consideration of said model bias during the color adjustment process can increase the accuracy of said process. For example, European patent EP 2149038 B1 discloses a color adjustment algorithm based on a physical model in combination with a numerical optimization algorithm. The color adjustment algorithm minimizes the residual color difference between the coating batch and the reference color while considering a determined model bias of the physical model as constant offset for the color adjustment. Thus, the adjusted sample coating formulation is a function of the reference color and the offset between the predicted reflectance data and the measured reflectance data of the sample coating. This color adjustment algorithm is based on the fundamental assumption that the model bias keeps constant if the formulation changes in "small" scale", i.e. as long the adjusted coating formulation is "similar" to the original coating formulation the model bias is also expected to be similar.

A limitation of this approach is that the optical properties (e.g. the colorant strength characteristics) of colorants are not constant over time and typically change from production batch to production batch within specific ranges due to deviations in the raw materials like, e.g. pigments. Colorant strength is defined as the ability of a colorant to modify the color of a coating layer and can be used as a metric for the efficiency of a colorant because it measures the degree of color change per quantity of colorant. The colorant strength can be defined according to the following formula:

$$\text{Colorant Strength} \sim \frac{\partial \text{Color}}{\partial \text{Concentration}}$$

Examples for the colorant strength are e.g. the tinting strength of colorants used for tinting or the tint reducing power for white colorants.

The bigger the colorant strength of a colorant, the bigger its impact on the color of the coating layer. The colorant strength characteristic of each colorant is therefore correlated with the scale of the absorption and scattering properties "K" and "S" of a colorant.

In conclusion, the colorant strength characteristics of the colorants, such as pigment pastes, present in colorant batches used to prepare the sample coating formulation may differ from the colorant strength characteristics of colorants present in reference colorant batches used to prepare the reference coatings. Depending on the scale of the difference in colorant strength characteristics and the scale of the color difference between the sample coating and the reference coating, the color adjustment results can be significantly inaccurate despite considering the model bias as described in EP 2149038 B1.

It would therefore be desirable to provide methods and systems for generating adjusted coating formulations to sufficiently match the color of a reference coating which are not associated with the aforementioned drawbacks. More specifically, the computer-implemented methods and systems for determining an adjusted sample coating formulation to match the color of a reference coating should provide more accurate color adjustment results, in particular by considering variations in the colorant strength of colorants present in the coating formulation.

Definitions

"Reference coating" may refer to a coating having defined properties, such as defined colorimetric properties. The reference coating can be prepared by applying at least one defined coating material to a surface and curing said applied coating material, with the proviso that at least one of the defined coating materials contains at least one colorant. In contrast, the term "sample coating" may refer to a coating that is evaluated in comparison with the reference coating with respect to at least part of the defined properties, such as colorimetric properties. The sample coating can be prepared as described for the reference coating, preferably by using the same number and type of coating formulations as used for preparing the reference coating. The term "sample coating formulation" refers to the coating material used to prepare the sample coating while the term "reference coating formulation" refers to the coating material used to prepare the reference coating. The term "modified sample coating formulation" refers to a sample coating formulation where at least one component present within the sample coating formulation has been modified, for example by modifying the amount of said component, with respect to the sample formulation (i.e. the unmodified sample formulation). The terms "formulation", "color formulation" and "paint formulation" are used synonymously herein.

"Display device" refers to an output device for presentation of information in visual or tactile form (the latter may be used in tactile electronic displays for blind people). "Screen of the display device" refers to physical screens of display devices and projection regions of projection display devices alike.

"Color data" includes reflectance data, color space data, such as CIEL*a*b* values or CIEL*C*h* values, gloss data, texture parameters, such as sparkle characteristics and/or coarseness characteristics, or a combination thereof.

"Digital representation" may refer to a representation of a sample coating, of a reference coating and of individual color components in a computer readable form. In particular, the digital representation of the sample coating includes at least color data of the sample coating and the sample coating formulation, in particular color data of the sample coating and the sample coating formulation obtained by determining said color data using a measurement device, such as a multi-angle spectrophotometer. The digital representation of the sample coating may further include data being indicative of the sample coating, such as e.g. the color number/color code/bar code/unique database ID associated with the sample coating, the layer structure of the sample coating, the wet or dry film thickness of the sample coating, instructions to prepare the sample coating material(s) associated with the sample coating, the price, predefined criteria for optical data of individual components to be adapted, or a combination thereof. The digital representation of the reference coating includes at least color data of the reference coating, in particular color data of the reference coating obtained by determining said color data using a measurement device, such as a multi-angle spectrophotometer. The digital representation of the reference coating may further include data being indicative of the reference coating, such as e.g. the color number/color code/bar code/unique database ID associated with the reference coating, the reference coating formulation, the layer structure of the reference coating, the wet or dry film thickness of the reference coating (also referred to as target wet or dry film thickness hereinafter), instructions to prepare the reference coating formulation(s) associated with the reference coating, the price, data being indicative of the method to determine color difference(s), such as color tolerance equations or other methods including shape similarity of spectral curves, predefined criteria for optical data of individual components to be adapted, or a combination thereof. The digital representation of the individual color components includes at least optical data of individual color components. The digital representation of the individual color components may further include data being indicative of the individual color components, such as e.g. the material code/number or tradename associated with the individual color component, predefined criteria for optical data of individual components to be adapted or a combination thereof.

"Individual color component" refers to separate components present within a coating formulation, such as the sample coating formulation and the reference coating formulation. Examples of individual color components include pigments, such as color and effect pigments, binders, solvents and additives, such as for example matting pastes. With preference, the term "individual color component" refers to pigment pastes or pigments, such as color and effect pigments.

"Optical data of individual color components" refers to optical properties and/or the specific optical constants of the individual color components. The optical constants of the individual color components are parameters in a physical model which can be determined as previously described by preparing reference coatings using reference batches of pigment pastes and determining the optical properties, for example by measuring the reflectance spectra of the prepared reference coating with a spectrophotometer. From the reflectance spectra and the corresponding formulation data, the specific optical properties, such as the K/S constants, can be determined and assigned as optical data to the respective individual color components. The terms "optical data of individual color components", "optical data of the individual color components" or "optical data of the colorants" are used synonymously.

The term "physical model" refers to a deterministic color prediction model based on physical laws. With particular preference, the physical model used according to the invention is based on physical laws describing the light absorption and light scattering properties of pigmented systems.

The term "model bias" (also called physical model bias hereinafter) refers to the systematical error of the physical model during prediction of color data based on the coating formulation and optical data of individual color components. The systematical error comprises limitations of the physical model as well as a bias present in the optical data of the individual color components present in the sample coating formulation. The bias present in the optical data of individual color components arises i.a. from the difference in colorant strength characteristics of pigment pastes used to prepare the reference coatings and colorant strength characteristics of pigment pastes used to prepare the sample coatings because the colorant strength characteristics of pigment pastes deviates from batch to batch due to deviations in the raw materials (such as pigments) used to prepare the pigment pastes. The term "residual model bias" refers to the model bias remaining after adjusting the optical data of the individual color components such that the predicted color data using the adjusted optical data is better matching the measured color than the predicted color data using optical data of determined for reference colorant batches. Adjusting the optical data of the individual color components allows to consider the different colorant strength characteristics of pigment pastes during the color adjustment process.

"Communication interface" may refer to a software and/or hardware interface for establishing communication such as transfer or exchange or signals or data. Software interfaces may be e.g. function calls, APIs. Communication interfaces may comprise transceivers and/or receivers. The communication may either be wired, or it may be wireless. Communication interface may be based on or it supports one or more communication protocols. The communication protocol may a wireless protocol, for example: short distance communication protocol such as Bluetooth®, or WiFi, or long distance communication protocol such as cellular or mobile network, for example, second-generation cellular network ("2G"), 3G, 4G, Long-Term Evolution ("LTE"), or 5G. Alternatively, or in addition, the communication interface may even be based on a proprietary short distance or long distance protocol. The communication interface may support any one or more standards and/or proprietary protocols.

"Computer processor" refers to an arbitrary logic circuitry configured to perform basic operations of a computer or system, and/or, generally, to a device which is configured for performing calculations or logic operations. In particular, the processing means, or computer processor may be configured for processing basic instructions that drive the computer or system. As an example, the processing means or computer processor may comprise at least one arithmetic logic unit ("ALU"), at least one floating-point unit ("FPU)", such as a math coprocessor or a numeric coprocessor, a plurality of registers, specifically registers configured for supplying operands to the ALU and storing results of operations, and a memory, such as an L1 and L2 cache memory. In particular, the processing means, or computer processor may be a multicore processor. Specifically, the processing means, or computer processor may be or may comprise a Central Processing Unit ("CPU"). The processing means or computer processor may be a ("GPU") graphics processing unit, ("TPU") tensor processing unit, ("CISC") Complex Instruction Set Computing microprocessor, Reduced Instruction Set Computing ("RISC") microprocessor, Very Long Instruction Word ("VLIW") microprocessor, or a processor implementing other instruction sets or processors implementing a combination of instruction sets. The processing means may also be one or more special-purpose processing devices such as an Application-Specific Integrated Circuit ("ASIC"), a Field Programmable Gate Array ("FPGA"), a Complex Programmable Logic Device ("CPLD"), a Digital Signal Processor ("DSP"), a network processor, or the like. The methods, systems and devices described herein may be implemented as software in a DSP, in a micro-controller, or in any other side-processor or as hardware circuit within an ASIC, CPLD, or FPGA. It is to be understood that the term processing means or processor may also refer to one or more processing devices, such as a distributed system of processing devices located across multiple computer systems (e.g., cloud computing), and is not limited to a single device unless otherwise specified. The terms "processor" and "computer processor" are used synonymously herein.

"Data storage medium" may refer to physical and other computer-readable media for carrying or storing computer-executable instructions and/or data structures. Such computer-readable media can be any available media that can be accessed by a general-purpose or special-purpose computer system. Computer-readable media may include physical storage media that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

"Database" may refer to a collection of related information that can be searched and retrieved. The database can be a searchable electronic numerical, alphanumerical, or textual document; a searchable PDF document; a Microsoft Excel® spreadsheet; or a database commonly known in the state of the art. The database can be a set of electronic documents, photographs, images, diagrams, data, or drawings, residing in a computer readable storage media that can be searched and retrieved. A database can be a single database or a set of related databases or a group of unrelated databases. "Related database" means that there is at least one common information element in the related databases that can be used to relate such databases.

"Client device" may refer to a computer or a program that, as part of its operation, relies on sending a request to another program or a computer hardware or software that accesses a service made available by a server.

SUMMARY

To address the above-mentioned problems in a perspective the following is proposed:

a computer-implemented method for determining an adjusted sample coating formulation to match the color of a reference coating, said method comprising:

- (i) providing to a computer processor via a communication interface
  - a digital representation of the sample coating containing color data of the sample coating and the sample coating formulation,
  - a digital representation of the reference coating containing color data of the reference coating,
  - a digital representation of individual color components containing optical data of individual color components, and
  - a physical model configured to predict the color of the sample coating by using as input parameters the sample coating formulation and optical data of individual color components;
- (ii) determining—with the computer processor—the color difference between the provided color data of the sample coating and the provided color data of reference coating;
- (iii) determining—with the computer processor—the model bias of the provided physical model by
  - predicting color data of the sample coating based on the digital representation of the sample coating, the digital representation of individual color components and the physical model provided in step (i), and
  - determining the color difference between the provided color data of the sample coating and the predicted color data of the sample coating;
- (iv) minimizing—with the computer processor—the model bias determined in step (iii) by adapting the provided optical data of individual color components for at least part of the individual color components present in the sample coating formulation;
- (v) determining—with the computer processor—the residual model bias by determining the color difference between the provided color data of the sample coating and the predicted color data using the optical data adapted in step (iv);
- (vi) calculating—with the computer processor—an adjusted sample coating formulation based on the color difference determined in step (ii), the adapted optical data of individual color components obtained in step (iv), the residual model bias determined in step (v) and the provided physical model; and
- (vii) providing the calculated adjusted sample coating formulation via a communication interface.

It is an essential advantage of the method according to the present invention that the part of the model bias of the physical model caused by variations of colorant strength characteristics of pigment pastes used in the production of reference and sample coating materials (colorant strength variations of individual color components) is minimized. To minimize this part of the model bias caused by variations of colorant strength characteristics, the model bias of a sample coating is correlated with colorant strength variations of the included individual color components within the physical model. This is done by adapting the provided optical data of the individual color components included in the sample coating formulation such that the model bias of the physical model is minimized. This results in adapted optical data which more accurately describes the real optical properties of the individual color components used within the sample coating formulation. The following adjustment of the sample coating formulation using the adapted optical data of individual color components results in a more robust and more accurate color adjustment, allowing to obtain a sufficient color match with fewer adjustment steps as compared to the methods known in the state of the art. This significantly increases the efficiency of the inventive color adjustment method.

In step (i) of the inventive method, the digital representation of the sample coating and the reference coating, the digital representation of individual color components and the physical model (i.e. a physical color prediction model) are provided via the communication interface to the computer processor.

In an aspect of step (i), providing the digital representation of the sample coating and/or the digital representation of the reference coating comprises determining color data of the sample coating and/or the reference coating with a measuring device and providing the determined color data optionally in combination with further data and/or meta data and/or user input via the communication interface to the computer processor. The color data can be determined using commercially available multi-angle spectrometers such as a Byk-Mac® I or a spectrometer of the XRite MAR-T-family. For this purpose, reflectance of the respective sample and/or reference coating is measured for several geometries. In case of effect coatings, texture images (grey scale or color images) are preferably acquired at several geometries. The multi-angle spectrophotometer is preferably connected to a computer processor which may be programmed to process the measured reflectance data and texture images, for example by calculating the color data for each measurement geometry from the measured reflectance and/or texture characteristics for defined measurement geometry. The determined color data may be stored on a data storage medium, such as an internal memory or a database prior to providing the determined color data via the communication interface to the computer processor. This may include interrelating the determined color data with further data and/or meta data and/or user input prior to storing the determined color data such that the stored color data can be retrieved using the further data and/or meta data and/or user input if needed. Storing the determined color data may be preferred if said data is needed several times since the data does not have to be acquired each time the appearance of the respective effect coating is to be displayed on the screen of a display device.

Further data and/or meta data and/or user input may include the previously listed color number/color code/bar code/unique database ID associated with the respective coating, the layer structure of the respective coating, the wet or dry film thickness of the respective coating, instructions to prepare the respective coating material(s) associated with the respective coating, the price or a combination thereof.

In an alternative aspect, providing the digital representation of the reference coating comprises providing the digital representation of the sample coating and/or providing data being indicative of the reference coating, retrieving the digital representation of the reference coating based on the provided representation of the sample coating and/or the provided data being indicative of the reference coating and providing the retrieved digital representation of the reference coating.

Data being indicative of the reference coating may include the color name, color number, color code, bar code, ID, etc. associated with the reference coating. The data being indicative of the reference coating may be inputted by the user via a GUI displayed on the screen of a display device, retrieved from a database based on scanned code, such as a QR code, or may be associated with a pre-defined user action. Predefined user actions may include selecting a desired action on the GUI displayed on the screen of the display device, such as, for example, displaying a list of stored measurements including associated images or displaying a list of available reference coatings according to searching criteria, user profile, etc.

In one example, retrieving the digital representation of the reference coating based on the provided digital representation of the sample coating includes accessing a database containing digital representations of reference coatings interrelated with data contained in the digital representation of the sample coating, such as the color name, color code, bar code, etc. of the sample coating, and retrieving the digital representation of the reference coating based on the data contained in the digital representation of the sample coating from the database. The database is preferably connected to the computer processor via the communication interface and the digital representation of the sample coating may be provided to the computer processor by selecting a digital representation stored on a data storage medium, for example via a GUI displayed on the screen of the display device or by entering data being indicative of the sample coating, such as the color name, the color code, etc. and retrieving the digital representation of the sample coating based on the entered data.

The digital representation of the sample coating comprises color data of the sample coating as well as the sample coating formulation, i.e. the types and amounts of ingredients present in the sample coating formulation. The color data of the sample coating is preferably color data determined with a measuring device and does therefore not include simulated color data, i.e. color data not generated from measured data, such as reflectance values or texture images. In an aspect, the digital representation of the sample coating further comprises data being indicative of the sample coating, the layer structure of the sample coating, instructions to prepare the sample coating formulation(s), the price, predefined criteria for optical data of individual components to be adapted, or a combination thereof. Data being indicative of the sample coating may include, for example, the color number, the color code, a unique database ID, a bar code, or a combination thereof.

The digital representation of the reference coating comprises color data of the reference coating. The color data of the reference coating is preferably color data determined with a measuring device and does therefore not include simulated the color data, i.e. color data not generated from measured data, such as reflectance values or texture images. In an aspect, the digital representation of the reference coating further comprises data being indicative of the reference coating, the layer structure of the reference coating, the formulation associated with the reference coating, instructions to prepare the reference coating formulation(s), the price, data being indicative of the method to determine color difference(s), such as color tolerance equations or other methods including shape similarity of spectral curves, predefined criteria for optical data of individual components to be adapted, or a combination thereof. Data being indicative of the reference coating may include, for example, the color number, the color code, a unique database ID, a bar code, or a combination thereof.

In an aspect, the color data includes reflectance data, color space data, in particular CIEL*a*b* values or CIEL*C*h* values, gloss data, texture parameters, in particular sparkle characteristics and/or coarseness characteristics, or a combination thereof.

The color data can be determined with a multi-angle spectrophotometer as previously described. The color data can be modified by using a color and/or texture offset, for example to lighten or to darken the color.

The digital representation of the individual color components comprises optical data of individual color components. In an aspect, said digital representation further comprises data being indicative of the individual color components. Data being indicative of the individual color components may be a name, a tradename, a unique ID associated with the component (i.e. a material code or number) or a combination thereof.

In an aspect, the optical data of individual color components includes optical constants of the individual color components, in particular wavelength dependent scattering and absorption properties of the individual color components. The optical constants may further include the orientation of individual color components, such as effect pigments, within the coating.

In step (ii), the color difference between the provided color data of the sample coating and the provided color data of the reference coating is determined with the computer processor. Step (ii) may be also be performed after step (iii). Thus, the order of steps (ii) and (iii) can be reversed, i.e. step (iii) can be performed prior to step (ii).

In an aspect, the color difference in step (ii) and/or (iii) and/or (v) is determined using a color tolerance equation, in particular the Delta E (CIE 1994) color tolerance equation, the Delta E (CIE 2000) color tolerance equation, the Delta E (DIN 99) color tolerance equation, the Delta E (CIE 1976) color tolerance equation, the Delta E (CMC) color tolerance equation, the Delta E (Audi95) color tolerance equation, the Delta E (Audi2000) color tolerance equation or other color tolerance equations.

In an alternative aspect, the color difference in step (ii) and/or (iii) and/or (v) is determined using the shape similarity of spectral curves. Use of the shape similarity of the spectral curves is preferable because it avoids changing the characteristic or "fingerprint" of the individual color components which would render the color adjustment process more complicated.

The determined color difference may be stored on a data storage medium, such an internal data storage medium or a database. The determined color difference may be interrelated with further data, such as data contained in the provided digital representation of the sample coating formulation, to allow retrieval of the data in any one of the following method steps.

In an aspect, steps (ii) to (vii) are performed simultaneously. "Simultaneously" refers to the time it takes the computer processor to perform steps (ii) to (vii). Preferably, the time is small enough such that the adjusted sample formulation can be generated ad-hoc, i.e. within a few milliseconds after initiating step (ii).

In step (iii), the model bias of the provided physical model is determined with the computer processor. As previously described, the model bias of the provided physical model is mainly caused by biased specific optical constants which are due to colorant strength variations of individual color components between the reference color components and the color components used to prepare the sample coating formulation and by limitations of the physical model. To determine the model bias, the physical model is used to predict the color data of the sample coating based on the provided digital representation of the sample coating and the provided digital representation of the individual color components. Afterwards, the color difference between the color data of the sample coating contained in the provided digital representation of the sample coating and the predicted color data of the sample coating is determined. The color difference may be determined as described previously in relation to step (ii).

In an aspect, the color data of the sample coating is predicted in step (iii) using the sample coating formulation and the optical data, in particular the optical constants, of the individual color components present within the sample coating formulation as input parameters for the provided physical model. The provided physical model then predicts the color data, such as reflectance data, of the sample coating formulation based on the input parameters. The predicted color data may be stored on a data storage medium, such an internal data storage medium or a database. The predicted color data may be interrelated with further data, such as data contained in the provided digital representation of the sample coating formulation, to allow retrieval of the data in any one of the following method steps.

In step (iv) of the inventive method, the determined model bias is minimized with the computer processor by adapting the provided optical data of at least part of the individual color components present in the sample coating formulation. Correlation of the model bias of the sample coating with colorant strength variations of the included individual color components within the provided physical model allows to better describe the real optical properties of the individual color components used to produce the sample coating formulation, thus resulting in a more accurate calculation of an adjusted sample coating formulation in step (vi) of the inventive method.

In an aspect, minimizing the model bias determined in step (iii) includes

- providing a numerical method configured to adapt the optical data of at least part of the individual color components present in the sample coating formulation by minimizing a given cost function starting from the optical data provided in step (i), and
- adapting the optical data of at least part of the individual color components present in the sample coating formulation using the provided numerical method and the provided physical model by comparing the recursively predicted color data of the sample coating obtained with the provided physical model with the provided color data of the sample coating until the cost function falls below a given threshold value or until the number of iterations reaches a predefined limit.

Minimizing the model bias thus includes adapting the optical data of at least part of the individual color components present in the sample coating formulation using the provided numerical method and physical model. In one example, the optical data of all individual color components is adapted. In another example, the optical data of only part of the individual color components is adapted as described below, thus leaving the optical data of the remaining part of the individual color components unchanged.

A suitable numerical method includes the COBYLA (Constrained Optimization BY Linear Approximations) method as described in M. J. D. Powell, “A direct search optimization method that models the objective and constraint functions by linear interpolation,” Advances in Optimization and Numerical Analysis, eds. S. Gomez and J.-P. Hennart (Kluwer Academic: Dordrecht, 1994), pages 51 to 67. The COBYLA method is a local derivative-free optimization which supports arbitrary nonlinear inequality and equality constraints.

The numerical method may be stored on a data storage medium, such as the internal memory of a computing device comprising the computer processor or in a database connected via the communication interface to the computer processor. Upon performing step (iv), the computer processor retrieves the numerical method from the data storage medium, such as the computer processor.

The adapted optical data and/or the recursively predicted color data of the sample coating may be stored on a data storage medium, such as an internal data storage or a database. In one example, the adapted color data and/or all recursively predicted color data is stored. This may be preferred if limitation of data storage is not critical. In another example, the adapted color data and/or only part of the recursively predicted color data, such as the predicted color data associated with adapted optical constants for which the cost function falls below a given threshold value or which are obtained at the maximum limit of iterations, is stored on the data storage medium. This may be preferred if the data storage capacity is limited. The stored adapted optical data and/or predicted color data may be interrelated with data contained in the digital representation of the sample coating to allow retrieval of the stored data in any of the following steps of the inventive method.

In one example, the cost function is a color difference between the provided color data of the sample coating and the predicted color data of the sample coating. Said color difference can be calculated as described in relation to step (ii) above. In case the cost function is a color difference, the given threshold value is preferably a given color difference.

In one example, the cost function includes a penalty function which assigns a penalty term to larger adaptions of the optical data of at least part of the individual color components. The term “larger adaptations” denotes adaptions of the optical data of at least part of the individual color components of at least 10%. In one example, a penalty term is assigned to adaptions of the optical data of 10%. In another example, a penalty term is assigned to adaptions of the optical data of 20%. In yet another example, a penalty term is assigned to adaptions of the optical data of 50%. This allows to provide adjusted optical data which is as similar as possible to the original optical data (i.e. the optical data contained in the provided digital representation of individual color components) and prevents that the color of an individual color component is shifted excessively to compensate small color differences between the provided color data of the sample coating and the predicted color data of the sample coating or to compensate parts of the model bias or the residual model bias. Such an excessive shift of the color is undesirable because it results in implausible adjusted sample coating formulations which cannot be prepared using available individual color components.

Adaption of the optical data of at least part of the individual color components present in the sample coating formulation may include-prior to comparing the recursively predicted color data of the sample coating obtained with the provided physical model with the provided color data of the sample coating-determining optical data of individual color components to be adapted, in particular based on at least one predefined criteria. Examples of predefined criteria may include the amount of the individual color component present in the sample coating formulation and/or the type of individual color component, etc. The predefined criteria may be contained in the digital representation of the sample coating, the reference coating or the individual color components provided in step (i). This allows to adapt the optical data of only a defined number of individual color components, for example individual color components being present in a larger amount or individual color components not being white pigments, thus reducing the total number of variables to be used by the numerical method. Reducing the total number of variables makes the optimization method more robust, e.g. if colorants with similar optical behavior are present within in the sample coating formulation.

In one example, adapting the optical data of at least part of the individual color components present in the sample coating formulation includes applying a scaling function to said optical data.

A suitable scaling function includes a linear scaling function of formula (1)

$$OC_{i,j}^{adapted} = sf_{i,j} * OC_{i,j} \quad (1)$$

wherein

- $OC_{i,j}$ refers to the optical data, in particular the optical constants, of an individual color component contained in the sample coating formulation,
- $sf_{i,j}$ refers to the scaling factor used to scale $OC_{i,j}$, $$OC_{i,j}^{adapted}$$

refers to the adapted optical data, in particular the adapted optical constants, of an individual color component contained in the sample coating formulation,
- i refers to the index of the optical constants used for each individual color component as parameter in the physical model and ranges from 1 to n, and
- j refers to the index of individual color components contained in the sample coating formulation and ranges from 1 to m.

The same scaling factor $sf_{i,j}$ is preferably used for all wavelength dependent optical data of the individual color components, in particular for all wavelength dependent optical constants of the individual color components. Using the same scaling factor for all wavelength dependent optical data, such as all optical constants K and S, of the individual color components allows to preserve the characteristic or “fingerprint” of the individual color components during the adaption. In contrast, an arbitrary adaption of the optical data may result in a significant change of the characteristic or “fingerprint” of the individual color component(s) and renders the color adjustment process more complicated as previously described.

In step (v) of the inventive method, the residual model bias is determined with the computer processor by determining the color difference between the color data contained in the provided digital representation of the sample coating and the predicted color data which is obtained using the optical data adjusted in step (iv). The predicted color data obtained using the optical data adjusted in step (iv) refers to the predicted color data determined upon minimizing the model bias in step (iv) as described previously. The color difference can be determined as previously described in relation to step (ii).

In step (vi) of the inventive method, an adjusted sample coating formulation is calculated with the computer processor based on the color difference determined in step (ii), the adapted optical data of individual color components obtained in step (iv), the residual model bias determined in step (v) and the provided physical model.

In an aspect, calculating an adjusted sample coating formulation includes

- providing a numerical method configured to adjust the concentration of at least one individual color component present in the sample coating formulation by minimizing a given cost function starting from the concentrations of the individual color components contained in the provided digital representation of the sample coating, and
- adjusting the concentration of at least one individual color component present in the sample coating formulation using the provided numerical method, the adapted optical data obtained in step (iv), the residual model bias and the provided physical model by comparing the recursively predicted color data of the recursively adjusted formulation of the sample coating with the provided color data of the reference coating until the color difference falls below a given threshold value or until the number of iterations reaches a predefined limit.

A suitable numerical method includes the Levenberg-Marquardt algorithm (called LMA or LM), also known as the damped least-squares (DLS) method. The numerical method may be stored on a data storage medium, such as the internal memory of a computing device comprising the computer processor or in a database connected via the communication interface to the computer processor. Upon performing step (vi), the computer processor retrieves the numerical method from the data storage medium, such as the computer processor.

The residual model bias is considered during the adjustment of the concentration of at least one individual color component as a constant. This allows to consider the remaining model bias in case the model bias could not be minimized to zero in step (iv), thus increasing the accuracy of the calculation of the adjusted sample coating formulation.

In one example, the cost function is a color difference between the predicted color data of the sample coating and the color data of the reference coating. Said color difference can be calculated as described in relation to step (ii) above. In case the cost function is a color difference, the given threshold value is preferably a given color difference.

The formulation of the sample coating is adjusted in step (vi) using the adapted optical data obtained in step (iv) and the recursively adjusted sample coating formulation as input parameters for the provided physical model. The provided physical model then predicts the color data, such as reflectance data, of the adjusted sample coating formulation based on the input parameters. This prediction is performed for each adjustment of the sample coating formulation until the cost function falls below a given threshold value or the maximum limit of iterations is reached.

In step (vii) of the inventive method, the adjusted sample coating formulation calculated in step (vi) is provided via the communication interface. In an aspect, providing the calculated adjusted sample coating formulation includes providing said adjusted sample coating formulation optionally in combination with further data via the communication interface to a display device comprising a screen for display on the screen. The display device then displays the provided adjusted sample coating formulation and any further data on the screen, for example within a GUI.

In one example, the display device comprises an enclosure housing the computer processor performing steps (ii) to (vii) and the screen. The display device therefore comprises the computer processor and the screen. The enclosure may be made of plastic, metal, glass, or a combination thereof.

In another example, the display device and the computer processor performing steps (ii) to (vii) are configured as separate components. According to this example, the display device comprises an enclosure housing the screen but not the computer processor performing steps (ii) to (vii) of the inventive method. The computer processor performing steps (ii) to (vii) of the inventive method is thus present separately from the display device, for example in a further computing device. The computer processor of the display device and the further computer processor are connected via a communication interface to allow data exchange. Use of a further computer processor being present outside of the display device allows to use higher computing power than provided by the processor of the display device, thus reducing the computing time necessary to perform these steps and thus the overall time until the calculated adjusted sample coating formulation is displayed on the screen of the display device. This allows to display the calculated adjusted sample coating formulation ad hoc without requiring a display device with high computing power. The further computer processor can be located on a server, such that steps (ii) to (vii) of the inventive method are performed in a cloud computing environment. In this case, the display device may be used to provide the digital representations described in relation to step (i) and thus functions as client device which is connected to the server via a network, as described later on.

The display device may be a mobile or a stationary display device, preferably a mobile display device. Stationary display devices include computer monitors, television screens, projectors etc. Mobile display devices include laptops or handheld devices, such as smartphones and tablets.

The screen of the display device may be constructed according to any emissive or reflective display technology with a suitable resolution and color gamut. Suitable resolutions are, for example, resolutions of 72 dots per inch (dpi) or higher, such as 300 dpi, 600 dpi, 1200 dpi, 2400 dpi, or higher. This guarantees that the generated appearance data can displayed in a high quality. A suitably wide color gamut is that of standard Red Green Blue (sRGB) or greater. In various embodiments, the screen may be chosen with a color gamut similar to the gamut perceptible by human sight. In an aspect, the screen of the display device is constructed according to liquid crystal display (LCD) technology, in particular according to liquid crystal display (LCD) technology further comprising a touch screen panel. The LCD may be backlit by any suitable illumination source. The color gamut of an LCD screen, however, may be widened or otherwise improved by selecting a light emitting diode (LED) backlight or backlights. In another aspect, the screen of the display device is constructed according to emissive polymeric or organic light emitting diode (OLED) technology. In yet another aspect, the screen of the display device may be constructed according to a reflective display technology, such as electronic paper or ink. Known makers of electronic ink/paper displays include E INK and XEROX. Preferably, the screen of the display device also has a suitably wide field of view that allows it to generate an image that does not wash out or change severely as the user views the screen from different angles. Because LCD screens operate by polarizing light, some models exhibit a high degree of viewing angle dependence. Various LCD constructions, however, have comparatively wider fields of view and may be preferable for that reason. For example, LCD screens constructed according to thin film transistor (TFT) technology may have a suitably wide field of view. Also, screens constructed according to electronic paper/ink and OLED technologies may have fields of view wider than many LCD screens and may be selected for this reason.

The display device may comprise an interaction element to facilitate user interaction with the display device. In one example, the interaction element may be a physical interaction element, such as an input device or input/output device, in particular a mouse, a keyboard, a trackball, a touch screen or a combination thereof. The interaction element may be used to provide the digital representations to the computer processor in step (i) of the inventive method or to imitate further actions, as describe later on.

Examples of further data displayed with the calculated modified sample coating formulation may include data contained in the digital representation of the sample coating and/or the reference coating, the determined adapted color data of individual color components, the residual model bias or a combination thereof.

In an aspect, the inventive method further includes initiating at least one action associated with the adjustment of the sample coating formulation. The action may be a predefined action. In one example, the action may be initiated by the computer processor based on its programming. In another example, the action may be initiated after detecting a user input being indicative of initiating an action. The user input may be detected, for example, via the interaction element of the display device.

Initiating at least one action may include providing the adjusted sample coating formulation to a printing device and/or a data storage medium and/or a mixing equipment. The mixing equipment may be an automatic mixing equipment which is configured to add the adjusted amounts of individual color components to the already prepared sample coating formulation. In on example, the processor determines whether the calculated adjustment is above a given threshold value prior to providing the adjusted sample formulation to the printing device and/or the data storage medium and/or the mixing equipment. The given threshold value may be deviations, such as percentage deviations, of adjusted concentrations of individual color components compared to the concentrations of individual color components contained in the provided digital representation of the sample coating. This ensures that no unnecessary data transfer is performed if the adjusted sample coating formulation calculated in step (vii) is nearly identical to the sample coating formulation.

The inventive method allows to obtain more accurate and reliable color adjustments of a sample coating formulation necessary to sufficiently match the color of a reference coating by considering the variation of colorant strength characteristics between colorant batches used to prepare the sample coating and the reference coating. This allows to determine adjusted optical data for the colorants present within the sample coating formulation which more accurately describe the real colorant strength characteristics of said colorants and thus allow a more accurate and reliable color adjustment process, reducing the number of steps required to obtain a sufficient color match and thus significantly improving the efficiency of the inventive method.

Further disclosed is:

A computing apparatus for determining an adjusted sample coating formulation to match the color of a reference coating, said system comprising:

- a communication interface for providing
  - a digital representation of the sample coating containing color data of the sample coating and the sample coating formulation,
  - a digital representation of the reference coating containing color data of the reference coating,
  - a digital representation of individual color components containing optical data of individual color components, and
  - a physical model configured to predict the color of the sample coating by using as input parameters the sample coating formulation and optical data of individual color components; and
- a processing module in communication with the communication interface, the processing module comprising at least one computer processor; and
- a memory storing instructions that, when executed by the processing module, configure the computing apparatus to perform the steps of the inventive computer implemented method.

The inventive computing apparatus allows to more accurately and reliably determine the color adjustments required to obtain a sufficient color match of a sample coating with a reference coating because the variations in colorant strength characteristics between the colorant batches used to prepare the sample coating formulation and the reference coating formulation are considered during the color adjustment process.

In an aspect, the apparatus further comprises a display device having a screen. In this case, the display device is present separate from the processing module and the memory.

In an alternative aspect, the processing module and memory is present within a display device further comprising a screen to display the calculated adjusted sample coating formulation received from the processing module on the screen of the display device.

In an aspect, the apparatus further comprises at least one database containing the digital representations and/or the physical model. The digital representations and the physical model may be stored in one database or in several databases. The database(s) are connected via communication interface(s) to the processing module of the inventive apparatus to allow retrieval of the data stored in the databases by the processor(s) of the processing module.

In an aspect, the apparatus further comprises a measuring device to measure color data of the sample coating and/or the reference coating. The measuring device may be a spectrophotometer, such as a multi-angle spectrophotometer previously described. The reflectance data and texture images and/or texture characteristics determined with such spectrophotometers at a plurality of measurement geometries may be provided to the processing module via a communication interface and may be processed by the computer processor of the processing module or may be processed by the processor of the measuring device as previously described in connection with the inventive method. The measuring device may be connected to the processing module via a communication interface.

Further disclosed is:

A non-transitory computer-readable storage medium, the computer-readable storage medium including instructions that when executed by the computing apparatus as disclosed herein, cause said computing apparatus to perform the steps according to the computer-implemented methods described herein.

The disclosure applies to the methods, systems and non-transitory computer-readable storage media disclosed herein alike. Therefore, no differentiation is made between methods, systems and non-transitory computer-readable storage media. All features disclosed in connection with the inventive method are also valid for the system and non-transitory computer-readable storage media disclosed herein.

Further disclosed is the use of the method disclosed herein or the computing apparatus disclosed herein in color adjustment processes. The term “color adjustment processes” refers to processes in which the color of an existing sample coating formulation, for example a sample coating formulation retrieved from a database or a sample formulation calculated with a computer, is adjusted in at least one step to sufficiently match the color of a reference coating. With particular preference, the color adjustment process starts from a sample coating formulation which is retrieved from a database and which is used for producing a coating batch to match the color of the produced coating batch to the color of a reference coating in order to fulfil the requirements of the customer with respect to appearance of the coating resulting from the produced coating batch.

Further disclosed is a client device for determining an adjusted sample coating formulation to match the color of a reference coating at a server device, wherein the client device is configured to provide a digital representation of the sample coating containing color data of the sample coating and the sample coating formulation, a digital representation of the reference coating containing color data of the reference coating, and a digital representation of individual color components containing optical data of individual color components to a server device and wherein the server device is an inventive computing apparatus.

The server may be a HTTP server and may be accessed via conventional Internet web-based technology. Use of a client device is in particular useful, if the service of determining an adjusted sample coating formulation is provided to customers or in a larger company setup.

BRIEF DESCRIPTION OF THE DRAWINGS

These and other features of the present invention are more fully set forth in the following description of exemplary embodiments of the invention. To easily identify the discussion of any particular element or act, the most significant digit or digits in a reference number refer to the figure number in which that element is first introduced. The description is presented with reference to the accompanying drawings in which.

DETAILED DESCRIPTION

The detailed description set forth below is intended as a description of various aspects of the subject-matter and is not intended to represent the only configurations in which the subject-matter may be practiced. The appended drawings are incorporated herein and constitute a part of the detailed description. The detailed description includes specific details for the purpose of providing a thorough understanding of the subject-matter. However, it will be apparent to those skilled in the art that the subject-matter may be practiced without these specific details.

Figure 1:
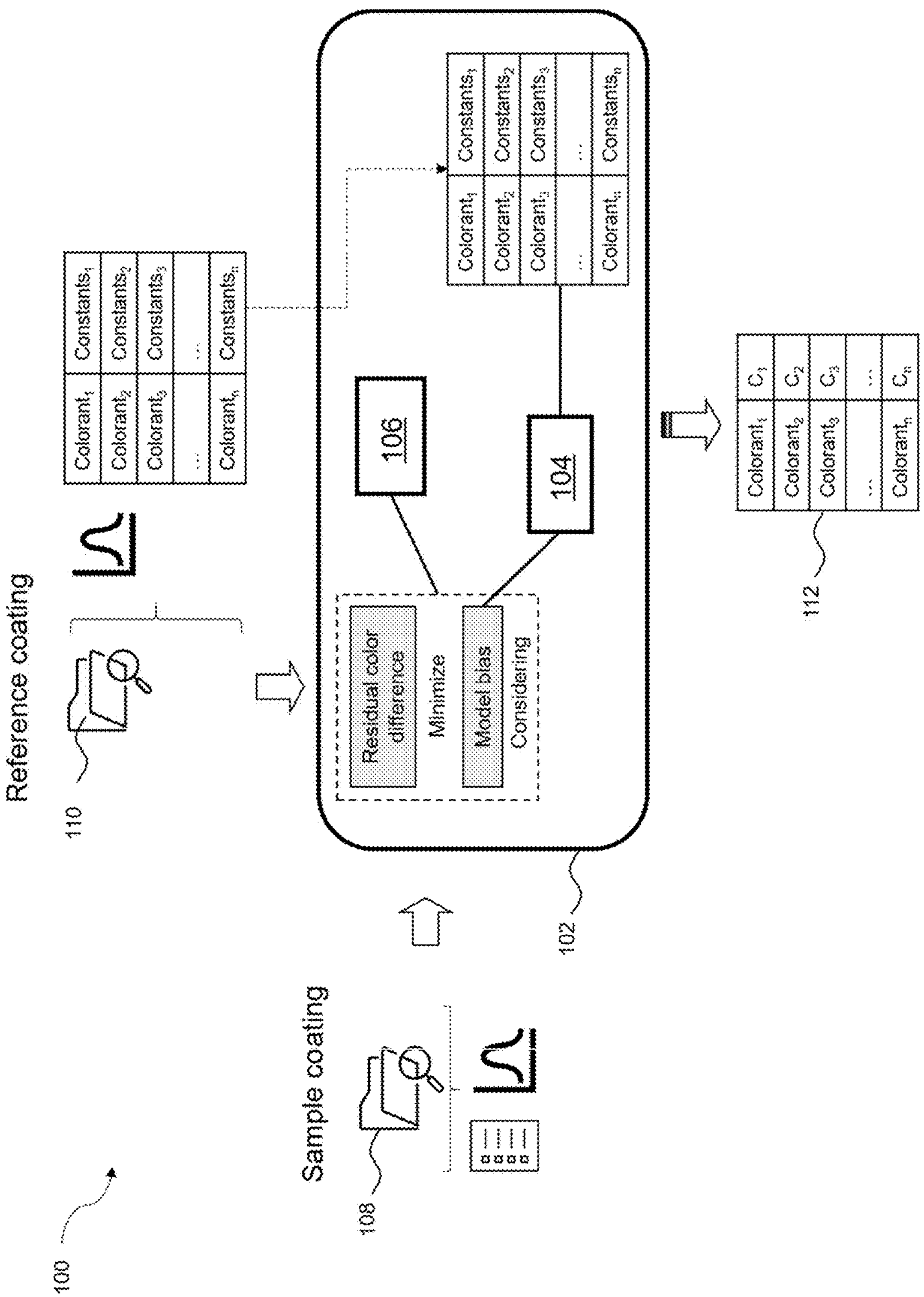
FIG. 1 illustrates a schematical drawing of a color adjustment method known in the state of the art.

FIG. 1 illustrates a schematical drawing of a color adjustment method 100 known in the state of the art, such as for example disclosed in EP 2149038 B1. The color adjustment method uses a physical model 104, for example a physical model describing the interaction of light with scattering or absorbing media, e.g. with colorants in coating layers, and a numerical optimization algorithm 106 both being implemented and running on at least one processor 102. The processor receives data of the sample coating and the reference coating.

Data of the sample coating 108 includes color data, such as reflectance data, of the sample coating prepared from a sample coating formulation as well as the formulation of the sample coating. The color data of the sample coating can be determined using a multi-angle spectrophotometer as described previously.

Data of the reference coating 110 includes color data, such as reflectance data, of the reference coating prepared from a reference coating formulation, and optical constants, such as K and S values, of individual color components (denoted as "colorant" in FIG. 1) present within the reference coating formulation. Each individual color component is associated with a set of constants, such as wavelength dependent K and S values. The provided optical constants as well as the sample coating formulation or the adjusted sample coating formulation are used as input parameters for the physical model 104 to predict the color data of the sample coating as described previously.

The predicted color data of the sample coating is used to determine the model bias as previously described by determining the color difference between the provided color data of the sample coating and the color data of the sample coating predicted with physical model 104. The determined model bias is then considered as a constant during adjustment of the sample coating formulation using numerical method 106.

After determining the model bias, numerical method 106 adjusts the concentration of at least one colorant present in the sample coating formulation by minimizing the color difference between the color data of the reference coating and color data of sample coating predicted by the physical model 104. Upon each adjustment of the sample coating formulation by numerical method 106, the physical model 104 is used to predict the color data based on the optical constants and the adjusted sample coating formulation. The adjustment is repeated by numerical method 106 until the color difference between the color data of the reference coating and the predicted color data of the adjusted sample coating reaches a given threshold or until a predefined maximum limit of iterations is reached. The adjusted sample formulation 112 associated with the color difference reaching the given threshold or the adjusted formulation 112 associated with the maximum number of iterations is then provided by the processor, for example via a communication interface, for display on a screen.

Figure 2:
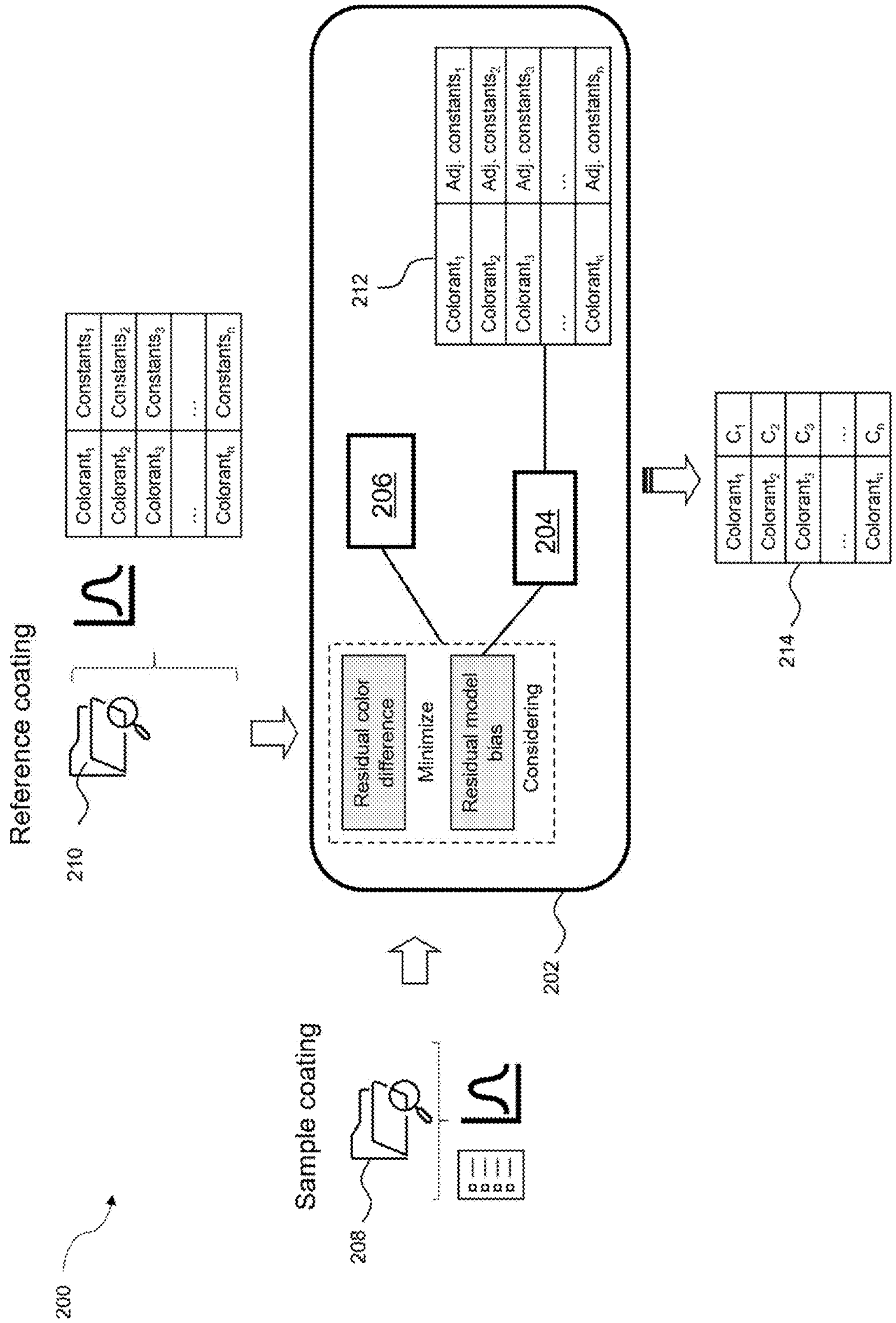
FIG. 2 illustrates a schematical drawing of the inventive color adjustment method.

FIG. 2 illustrates a schematical drawing of a color adjustment method 200 according to the invention. The inventive color adjustment method also uses a physical model 204, for example a physical model describing the interaction of light with scattering or absorbing media, e.g. with colorants in coating layers, and a numerical optimization algorithm 206 both being implemented and running on at least one processor 202.

Data of the sample coating 108 and data of the reference coating 110 are provided to the processor 202 as previously described in relation to FIG. 1. In contrast to the color adjustment methods described in FIG. 1, the physical model 204 uses adapted optical constants 212 (denoted "Adj. constants" in FIG. 2) to predict the color of the adjusted sample coating formulation. The adapted optical constants 212 of individual color components (denoted "colorants" in FIG. 2) are obtained by minimizing the model bias described in relation to FIG. 1 using the numerical optimization algorithm 206 and the physical model 204 as described in relation to the inventive method. Instead of the model bias, the residual model bias (i.e. the model bias remaining after adapting the optical constants) is considered. Use of the adapted optical constants allows to calculate a more accurate adjusted sample coating formulation because adjustment of the optical constants allows to consider deviations in the colorant strength of individual color components used to prepare the sample coating formulation and individual color components used to prepare the reference coating formulation as previously described.

After determining adapted optical constants of at least part of the individual color components present in the sample coating formulation, the numerical optimization algorithm 206 is used to adjust the concentration of at least one individual color component present in the sample coating formulation and the physical model 204 is used to predict the color data of the adjusted sample coating formulation using the adapted optical constants. The adjustment is repeated by numerical method 206 until the color difference between the color data of the reference coating and the predicted color data of the adjusted sample coating reaches a given threshold or until a predefined maximum limit of iterations is reached. The adjusted sample formulation 214 associated with the color difference reaching the given threshold or the adjusted formulation associated 214 associated with the maximum number of iterations is then provided by the processor, for example via a communication interface, for display on a screen.

Figure 3:
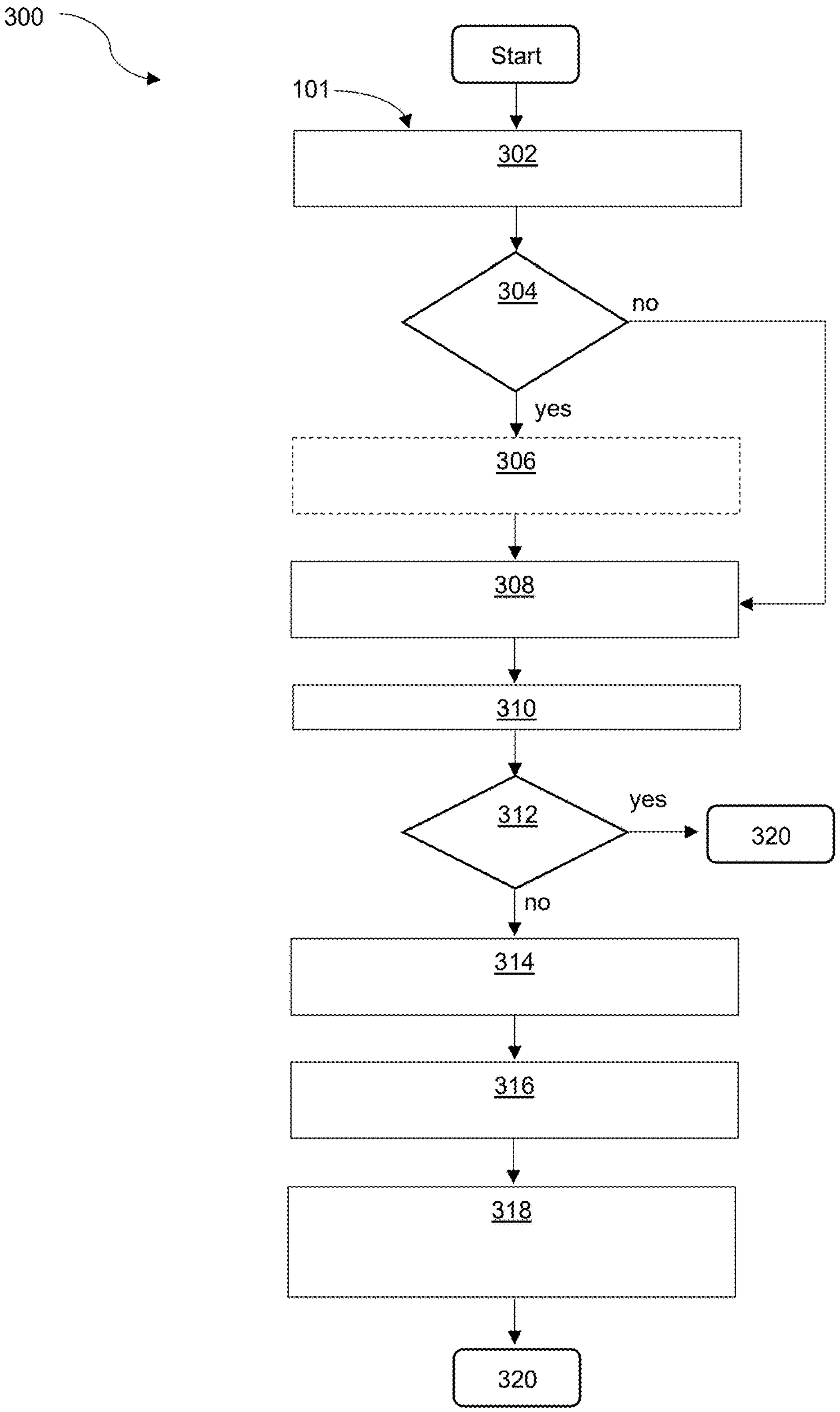
FIG. 3 is a block diagram of an embodiment of the inventive method for determining an adjusted sample coating formulation to match the color of a reference coating.
Figure 3:
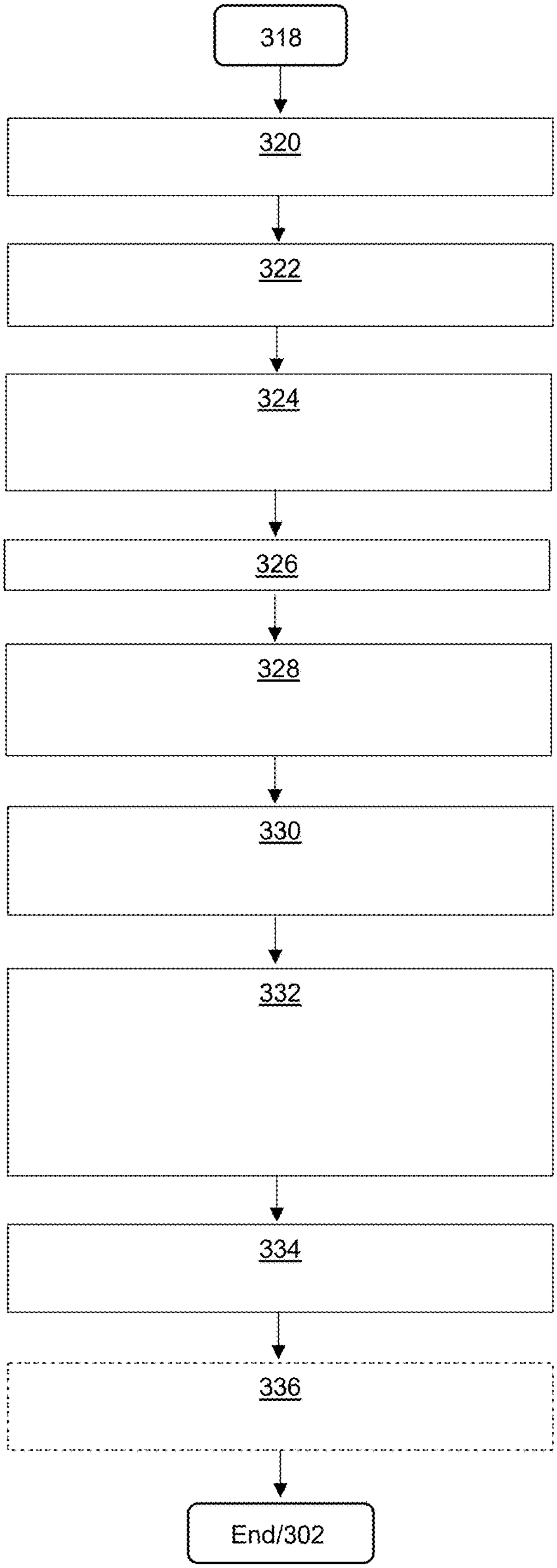

FIG. 3 depicts a non-limiting embodiment of a method 300 for determining an adjusted sample coating formulation to match the color of a reference coating according to one embodiment of the invention. In this example, the sample coating is a solid shade, i.e. a sample coating not comprising any effect pigments. In another example, the sample coating is an effect coating comprising at least one effect pigment. The inventive method may be used during production of a sample coating formulation to adjust the color of the produced sample coating formulation to match the color of a reference coating, for example to fulfill specifications in terms of optical appearance upon applying the sample coating material to a substrate, such as an automotive or a part thereof. In this example, the inventive method is performed on a mobile or stationary display device comprising an enclosure housing the screen and the computer processor(s) performing blocks 302 to 334 of FIG. 3 as described in relation to FIG. 4. In another example, the processor(s) performing blocks 302 to 336 of FIG. 3 are present separate from the display device having a screen on which the adjusted sample coating formulation is displayed, as described in relation to the client-server setup of FIG. 5.

In block 302 of method 300, routine 301 retrieves the digital representation of the reference coating containing color data of the reference coating. The color data, such as reflectance data and/or texture characteristics, can be determined using a multi-angle spectrophotometer as described in relation to step (i) of the inventive method. In this example, the digital representation of the reference coating (DRR) is retrieved based on data contained in the digital representation of the sample coating (DRS) provided to the processor(s) implementing routine 301. For this purpose, routine 301 may access a database containing digital representations of reference coatings interrelated with data contained in the digital representation of the sample coating, such as the color name, color code, bar code, etc. of the sample coating to retrieve the corresponding digital representation (DRR) based on the data contained in the provided digital representation of the sample coating from the database. In another example, the digital representation of the reference coating is retrieved based on data being indicative of the reference coating, such as the color name, color number, color code, etc. Said data may be entered by the user via a GUI and may be used by the processor(s) implementing routine 301 to retrieve the respective digital representation (DRR) from a database containing the digital representation (DRR) interrelated with the data entered by the user from a data storage medium, such as a database. In another example, the digital representation of the reference coating is retrieved by retrieving color data determined with a multi-angle spectrophotometer from said device, for example by connecting the device to the processor(s) implementing routine 301 and determining color data of the reference coating with said device.

In block 304, routine 301 determines whether data of the sample coating, i.e. color data and the formulation of the sample coating, is available. This may be determined, for example, by determining whether a digital representation of the sample coating containing color data and the sample coating formulation has been provided in block 302 or by displaying a menu prompting the user to select whether the data is available and detecting the user input. If the digital representation of the sample coating (DRS) has already been provided in step 302, routine 301 proceeds to block 308 described later on. If routine 301 determines in block 304 that data of the sample coating is available but has not yet been provided in block 302, routine 301 proceeds to block 306 described in the following. If routine 301 determines in block 304 that data of the sample coating is not available, it proceeds to block 308 described later on.

In block 306, routine 301 retrieves the digital representation of the sample coating (DRS) containing color data of the sample coating and the formulation of the sample coating, this block being generally optional. Color data, such as reflectance data and/or texture characteristics, can be determined as described previously with a multi-angle spectrophotometer. In one example, the digital representation of the sample coating is retrieved from a database based on the data contained in the digital representation (DRR) retrieved in block 304. In another example, the digital representation (DRS) is retrieved by retrieving color data determined with a multi-angle spectrophotometer from said device, for example by connecting the device to the processor(s) implementing routine 301 and determining color data of the sample coating with said device. In yet another example, the digital representation (DRS) is retrieved based on data being indicative of the sample coating, such as the color name, color number, color code, etc. Said data may be entered by the user via a GUI and may be used by the processor(s) implementing routine 301 to retrieve the respective digital representation (DRR) from a database containing the digital representation (DRS) interrelated with the data entered by the user from a data storage medium, such as a database.

In block 308, routine 301 retrieves the digital representation of individual color components (DRC) containing optical data, in particular optical constants such as scattering and absorption properties, of individual color components. The digital representation (DRC) may further contain data being indicative of the individual color components, such as the name, tradename, unique ID or a combination thereof. In one example, retrieval may be performed based on data contained in the digital representation (DRR) provided in block 304 and/or data contained in the digital representation (DRS) provided in block 306.

In block 310, routine 301 retrieves a physical model configured to predict the color of the sample coating by using as input parameters the sample coating formulation and optical data of individual color components. Suitable physical color prediction models are well known in the state of the art (see for example the physical model disclosed in EP 2149038 B1) and include physical models describing the interaction of light with scattering or absorbing media, e.g. with colorants in coating layers, such as the Kubelka/Munk model. In this example, the "Kubelka/Munk"-model is retrieved in block 310.

In block 312, routine 301 determines whether the digital representation of the sample coating (DRS) has been retrieved in block 306 or has been provided in block 302. If the digital representation (DRS) has been retrieved or provided, routine 301 proceeds to block 320 described later on. Otherwise, routine 301 proceeds to block 314 described in the following.

In block 314, routine 301 performs the so-called "match from scratch" method and determines a sample coating formulation using the digital representation (DRR) provided in block 302, the digital representation DCC provided in block 308 and the physical model provided in block 310. This method is applied e.g. if no formulation database is available. In practice the "match from scratch" method often starts with a pre-selection step of components which are expected to be in the reference coating formulation. This pre-selection step is not mandatory. The "match from scratch" method/algorithm calculates as a first solution one or more preliminary matching sample coating formulations for the reference coating.

In block 316, routine 301 provides the calculated matching formula(s) for display. In one example, the formula(s) are provided to a display device comprising a screen such that the formula(s) can be displayed on the screen of the display device, for example within a GUI. This allows the user to prepare sample coating material(s) based on the displayed formula(s). In one example, preparing the displayed sample coating material(s) may include transmitting the displayed sample coating formulation(s) to an automatic dosing equipment to automatically prepare respective sample coating material(s) based on the transmitted data. In another example, the sample coating material(s) may be prepared by manually dosing the respective components based on the displayed data.

In block 318, routine 301 retrieves color data of the sample coating prepared from the sample coating formulation(s) provided in block 316. Retrieval of color data may be performed as described in relation to block 302, such as for example by determining the color data using a multi-angle spectrophotometer.

In block 320, routine 301 determines the color difference between the provided color data of the sample coating and the provided color data of the reference coating. In this example, block 320 is performed prior to block 322. In another example, block 320 is performed after block 324 and prior to block 326. In this example, the shape similarity of spectral curves is used to determine the color difference. Use of the shape similarity of the spectral curves is preferable because it avoids changing the characteristic or "fingerprint" of the individual color components which would render the color adjustment process more complicated. In another example, the color difference is determined using a color tolerance equation, such as the Delta E (CIE 1994) color tolerance equation, the Delta E (CIE 2000) color tolerance equation, the Delta E (DIN 99) color tolerance equation, the Delta E (CIE 1976) color tolerance equation, the Delta E (CMC) color tolerance equation, the Delta E (Audi95) color tolerance equation or the Delta E (Audi2000) color tolerance equation. These equations may be contained in the digital representation (DRR) or (DRS). In this example, the determined color difference is interrelated with data being indicative of the sample coating and stored on a data storage medium.

In blocks 322 and 324, routine 301 determines the model bias of the provided physical model by predicting the color data of the sample coating layer in block 322 and determining the color difference between the provided color data of the sample coating and the predicted color data of the sample coating in block 324. As previously described, the model bias of the provided physical model is mainly caused by biased specific optical constants which are due to colorant strength variations of individual color components between the reference components and the components used to prepare the sample coating formulation and by limitations of the physical model.

In block 322, routine 301 predicts the color data of the sample coating based on the color data of the sample coating, the formulation of the sample coating, the digital representation DRC provided in block 308 and the physical model provided in block 310. In this example, the color data of the sample coating and the formulation of the sample coating are contained in the digital representation (DRS) provided in block 302 or 306. In another example, i.e. in case the "match from scratch" method was performed, the formulation of the sample coating was determined in block 314 and the color data was retrieved in block 318. In this example, the color data of the sample coating is predicted in block 322 using the provided sample coating formulation and the provided optical data, in particular the optical constants, of the individual color components present within the sample coating formulation as input parameters for the provided physical model. The predicted color data may be stored on a data storage medium, such an internal data storage medium or a database. The predicted color data may be interrelated with further data, such as data contained in the provided digital representation of the sample coating formulation, to allow retrieval of the data in any one of the following blocks.

In block 324, routine 301 determines the color difference between the provided color data of the sample coating and the color data of the sample coating predicted in block 322. The color difference can be determined as described previously in relation to block 320.

In blocks 326 and 328, the model bias determined in blocks 322 and 324 is minimized by routine 301 by adapting the provided optical data, in particular the optical constants, of at least part of the individual color components. Correlation of the model bias of the sample coating with colorant strength variations of the included colorants within the provided physical model allows to better describe the real optical properties of the individual color components used to produce the sample coating formulation, thus resulting in a more accurate calculation of an adjusted sample coating formulation in block 332 of the inventive method.

In block 326, routine 301 retrieves at least one numerical optimization algorithm (also called numerical method). The retrieved numerical optimization algorithms are configured to adapt the provided optical data and to adjust the concentration of at least one individual color component present in the retrieved sample coating formulation by minimizing a given cost function. In this example, the numerical optimization algorithm configured to adapt the provided optical data by minimizing a given cost function and the numerical optimization algorithm configured to adapt adjust the concentration of at least one individual color component present in the retrieved sample coating formulation by minimizing a given cost function are retrieved in block 326. In another example, block 326 is repeated prior to performing block 332 in case only the numerical optimization algorithm configured to adapt the provided optical data is retrieved in block 326. The algorithms may be retrieved from a data storage medium as described previously based on data interrelated with stored algorithms.

In block 328, routine 301 adapts the provided optical data, in particular the provided optical constants, of the least part of the individual color components present in the sample coating formulation using

- the retrieved numerical optimization algorithm configured to adapt the optical data of at least part of the individual color components present in the sample coating formulation by minimizing a given cost function starting from the retrieved optical data and
- the retrieved physical model.

Adaption is performed by comparing the recursively predicted color data of the sample coating obtained with the retrieved physical model with the retrieved color data of the sample coating until the cost function falls below a given threshold value or until the number of iterations reaches a predefined limit. In this example, the cost function is a color difference between the retrieved color data of the sample coating and the predicted, in particular recursively predicted, color data of the sample coating. The color difference can be calculated as described previously in relation to block 320. In this example, the given threshold value is a given color difference.

The adapted optical data and/or the recursively predicted color data of the sample coating generated in block 328 can be fully or at least partly stored on a data storage medium, such as an internal data storage or a database as previously described. The stored adapted optical data and/or predicted color data may be interrelated with data contained in the digital representation of the sample coating to allow retrieval of the stored data in any of the following blocks of method 300.

In one example, the cost function used in block 328 includes a penalty function which assigns a penalty term to larger adaptions of the optical data of at least part of the individual color components. This allows to provide adapted optical data which is as similar as possible to the original optical data (i.e. the optical data contained in the provided digital representation of individual color components) and prevents that the color of an individual color component is shifted excessively.

In case the optical data of only part of the individual color components present in the sample coating formulation is to be adapted in block 328, block 328 may include determining optical data of individual color components to be adapted, in particular based on at least one predefined criteria, prior to comparing the recursively predicted color data of the sample coating obtained with the provided physical model with the provided color data of the sample coating. The predefined criteria may be contained in the retrieved digital representations (DRS) and/or (DRR) and/or (DRC). This allows to adapt the optical data of only a defined number of individual color components, for example individual color components being present in a larger amount or individual color components not being white pigments, thus reducing the total number of variables to be used by the numerical method. Reducing the total number of variables reduces the computing time necessary to minimize the model bias or allows to use reduced computing resources to determine the model bias.

In this example, the optical data of at least part of the individual color components present in the sample coating formulation is adapted in block 328 by the numerical optimization algorithm using a scaling function, in particular the linear scaling function of formula (1) described previously. It is preferred to use the same scaling factor $sf_{i,j}$ for all wavelength dependent optical data of the individual color components, in particular for all wavelength dependent optical constants of the individual color components, because this allows to preserve the characteristic or "fingerprint" of the individual color components during the adaption in block 328, thus avoiding a significant change of the characteristic or "fingerprint" of the individual color component(s) which renders the color adjustment process more complicated as previously described.

In block 330, the residual model bias is determined by routine 301 by determining the color difference between retrieved color data of the sample coating and the predicted color data of the sample coating obtained during minimization of the model bias in block 328. The color difference can be determined as previously described in relation to block 320.

In block 332, routine 301 determines an adjusted sample coating formulation based on

- the color differences determined in blocks 320 and 330,
- adapted optical data obtained in block 328,
- the numerical optimization algorithm retrieved in block 326 and configured to adjust the concentration of at least one individual color component present in the sample coating formulation by minimizing a given cost function starting from the concentrations of the individual color components contained in the retrieved sample coating formulation, and
- the physical model retrieved in block 310.

In this example, the cost function is a color difference between the color data of the sample coating predicted in block 332 and the provided color data of the reference coating. Said color difference can be calculated as described in relation to block 320 above. In this example, the given threshold value may be a given color difference.

The formulation of the sample coating is adjusted in block 332 using the adapted optical data obtained in block 328 and the recursively adjusted sample coating formulation as input parameters for the retrieved physical model. The retrieved physical model then predicts the color data, such as reflectance data, of the adjusted sample coating formulation based on the input parameters. This prediction is performed for each adjustment of the sample coating formulation until the cost function falls below a given threshold value or the maximum limit of iterations is reached.

In block 334, routine 301 provides the adjusted sample coating formulation to a display device for display on the screen of the display device. In addition to the adjusted sample coating formulation, further data, such as data contained in the retrieved representation of the sample coating and/or the reference coating, the determined adapted color data of individual color components, the residual model bias or a combination thereof, may be provided for display in block 334. Suitable display devices may include the mobile or stationary display devices previously mentioned.

In block 336, routine 301 initiates at least one action associated with the adjustment of the sample coating formulation determined in block 332, this block being generally optional. The action(s) is/are preferably predefined action(s). In one example, the action may be initiated by routine 301 based on its programming. In another example, the action may be initiated after detecting a user input being indicative of initiating an action by routine 301. The user input may be detected, for example, via the interaction element of the display device. Initiating at least one action may include providing the adjusted sample coating formulation to a printing device and/or a data storage medium and/or a mixing equipment.

After the end of block 336, routine 301 either ends method 300 or returns to block 302.

Figure 4:
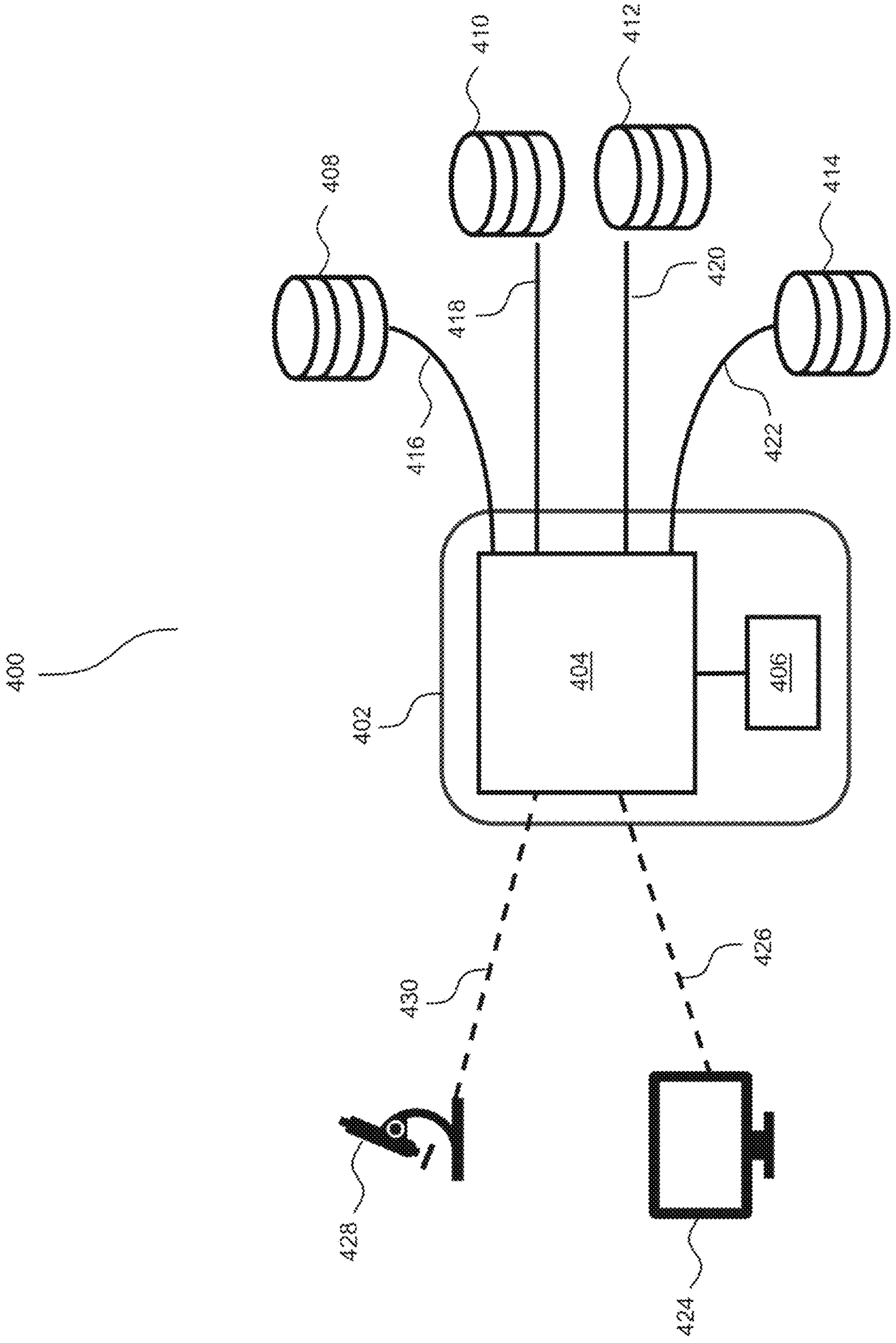
FIG. 4 illustrates an embodiment of the inventive system for determining an adjusted sample coating formulation to match the color of a reference coating.

FIG. 4 shows an example of a system 400 for determining an adjusted sample coating formulation to match the color of a reference coating which may be used to implement blocks 302 to 336 of method 300 described in relation to FIG. 3. System 400 comprises a computing device 402 housing computer processor 404 and memory 406. The processor 404 is configured to execute instructions, for example retrieved from memory 406, and to carry out operations associated with the computer system 400, namely

- receive via a communication interface
  - a digital representation of the sample coating containing color data of the sample coating and the sample coating formulation,
  - a digital representation of the reference coating containing color data of the reference coating,
  - a digital representation of individual color components containing optical data of individual color components, and
  - a physical model configured to predict the color of the sample coating by using as input parameters the sample coating formulation and optical data of individual color components;
- determining the color difference between the provided color data of the sample coating and the provided color data of reference coating;

determining the model bias of the retrieved physical model by predicting color data of the sample coating based on the digital representation of the sample coating, the digital representation of individual color components and the retrieved physical model, and determining the color difference between the retrieved color data of the sample coating and the predicted color data of the sample coating;

minimizing the determined model bias by adapting the retrieved optical data of individual color components for at least part of the individual color components present in the sample coating formulation;

determining the residual model bias by determining the color difference between the retrieved color data of the sample coating and the predicted color data using the adapted optical data;

calculating an adjusted sample coating formulation based on the determined color difference, the adapted optical data of individual color components, the determined residual model bias and the retrieved physical model; and providing the calculated adjusted sample coating formulation via a communication interface.

The processor 404 can be a single-chip processor or can be implemented with multiple components. In most cases, the processor 404 together with an operating system operates to execute computer code and produce and use data. In this example, the computer code and data resides within memory 406 that is operatively coupled to the processor 404. Memory 406 generally provides a place to hold data that is being used by the computer system 400. By way of example, memory 406 may include Read-Only Memory (ROM), Random-Access Memory (RAM), hard disk drive and/or the like. In another example, computer code and data could also reside on a removable storage medium and loaded or installed onto the computer system when needed. Removable storage mediums include, for example, CD-ROM, PC-CARD, floppy disk, magnetic tape, and a network component. The processor 404 can be located on a local computing device or in a cloud environment (see for example FIG. 5). In the latter case, display device 424 may serve as a client device and may access the server (i.e. computing device 402) via a network (i.e. communication interface 426).

The computing device 402 is connected via communication interface 416, 418, 420, 422 to databases 408, 410, 412, 414. Databases 408, 410, 412, 414 store the digital representations of the sample coating, the reference coating, the individual color components and the physical model which can be retrieved by processor 404 via communication interface 416, 418, 420, 422. The digital representation of the sample coating stored in said database contains color data as well as the formulation of the sample coating. The digital representation of the reference coating contains color data of the reference coating. The digital representation of the individual color components contains optical data, in particular optical constants, of the individual color components. In one example, the digital representations may each include further data as previously described. In one example, the respective digital representations of the sample coating and reference coating are retrieved from the respective database by processor 404 based on data being indicative of the sample coating and/or the reference coating inputted by the user via display device 424 or data being indicative of the sample coating and/or the reference coating associated with a predefined user action performed on the display device 424, for example by selecting a desired action (e.g. display of a list of stored and measured color data, display of a list of available sample/reference coatings, etc.) on the GUI of display device 424.

System 400 may further include a display device 424 which is coupled via communication interface 426 to computing device 404. Display device 424 receives the calculated adjusted sample coating formulation from processor 404 and displays the received adjusted sample coating formulation on the screen, in particular via a graphical user interface (GUI), to the user. For this purpose, display device 424 is operatively coupled to processor 404 of computing device 402 via communication interface 426. In this example, display device 424 is an input/output device comprising a screen and being integrated with a processor and memory (not shown) to form a desktop computer (all in one machine), a laptop, handheld or tablet or the like and is also used to allow user input to retrieve the digital representation(s) as described previously. In another example, the screen of display device 424 may be a separate component (peripheral device, not shown). By way of example, the screen of the display device 424 may be a monochrome display, color graphics adapter (CGA) display, enhanced graphics adapter (EGA) display, variable-graphics-array (VGA) display, super VGA display, liquid crystal display (e.g., active matrix, passive matrix and the like), cathode ray tube (CRT), plasma displays and the like.

The system may further include a measurement device 428, for example a multi-angle spectrophotometer, such that the color data of the reference coating and/or the sample coating can be determined with said device 428. The measurement device is coupled via communication interface 430 to processor 404 such that the determined data can be retrieved by processor 404. The determined data can either be measured data or color data already processed by the processor of the measurement device.

Figure 5:
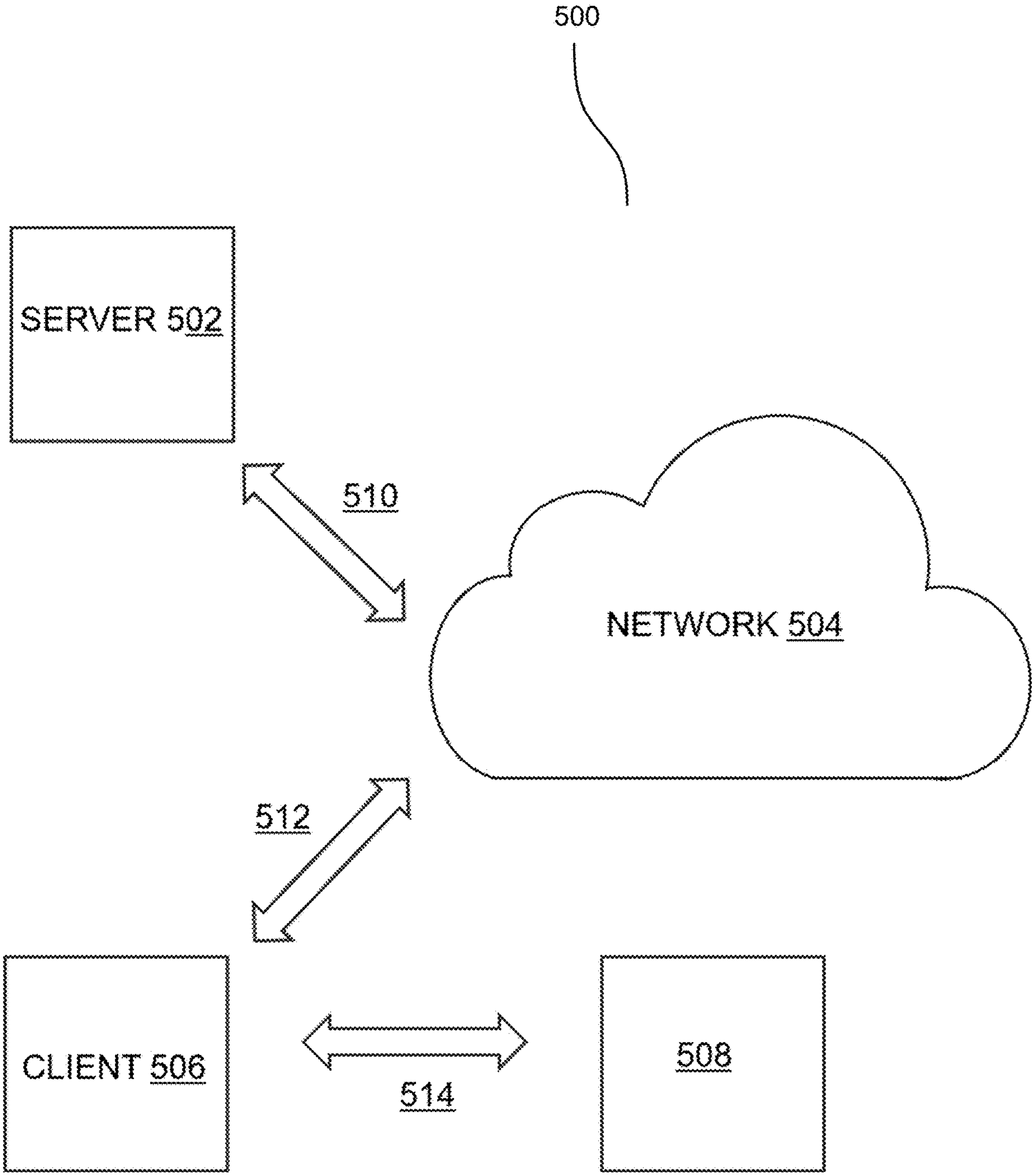
FIG. 5 illustrates client server setup for the inventive method.

Turning to FIG. 5, there is shown an Internet-based system 500 for determining an adjusted sample coating formulation to match the color of a reference coating which may be used to implement method 300 described in relation to FIG. 3. The system 500 comprises a server 502 which can be accessed via a network 504, such as the Internet, by one or more clients 506.1 to **506.*n*. In one example, the server corresponds to computing device 402 described in relation to FIG. 4. Preferably, the server may be an HTTP server and is accessed via conventional Internet web-based technology. The clients 306 are computer terminals accessible by a user and may be customized devices, such as data entry kiosks, or general-purpose devices, such as a personal computer. In one example, the client device corresponds to the display device 424 of FIG. 4. The clients comprise a screen and are used to display the generated appearance data. A printer 508 can be connected to a client terminal 506. The internet-based system 500 is in particular useful, if a service is provided to customers or in a larger company setup. A client 506** may be used to provide a digital representation of the sample coating containing color data of the sample coating and the sample coating formulation, a digital representation of the reference coating containing color data of the reference coating, and a digital representation of individual color components containing optical data of individual color components to the computer processor of the server.

Figure 6:
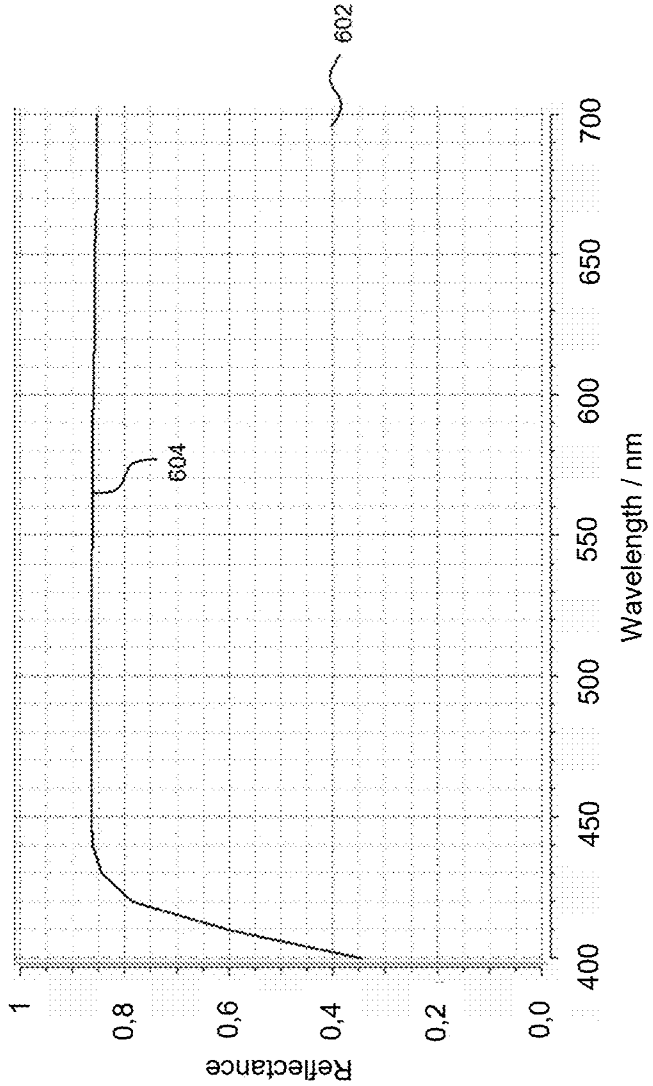
FIG. 6 illustrates a graph containing the reflectance spectrum of a reference coating (top) and the reference coating formulation (bottom)

FIG. 6 illustrates a graph 602 of a reflectance spectrum 604 of a reference coating (top) and the associated reference coating formulation 608 (bottom). On the left hand side, the color data 606 determined with a multi-angle spectrophotometer is shown. The reference coating contains large amounts of white pigments and is tinted with a small amount of black pigment having a colorant strength of 100%.

Figure 7:
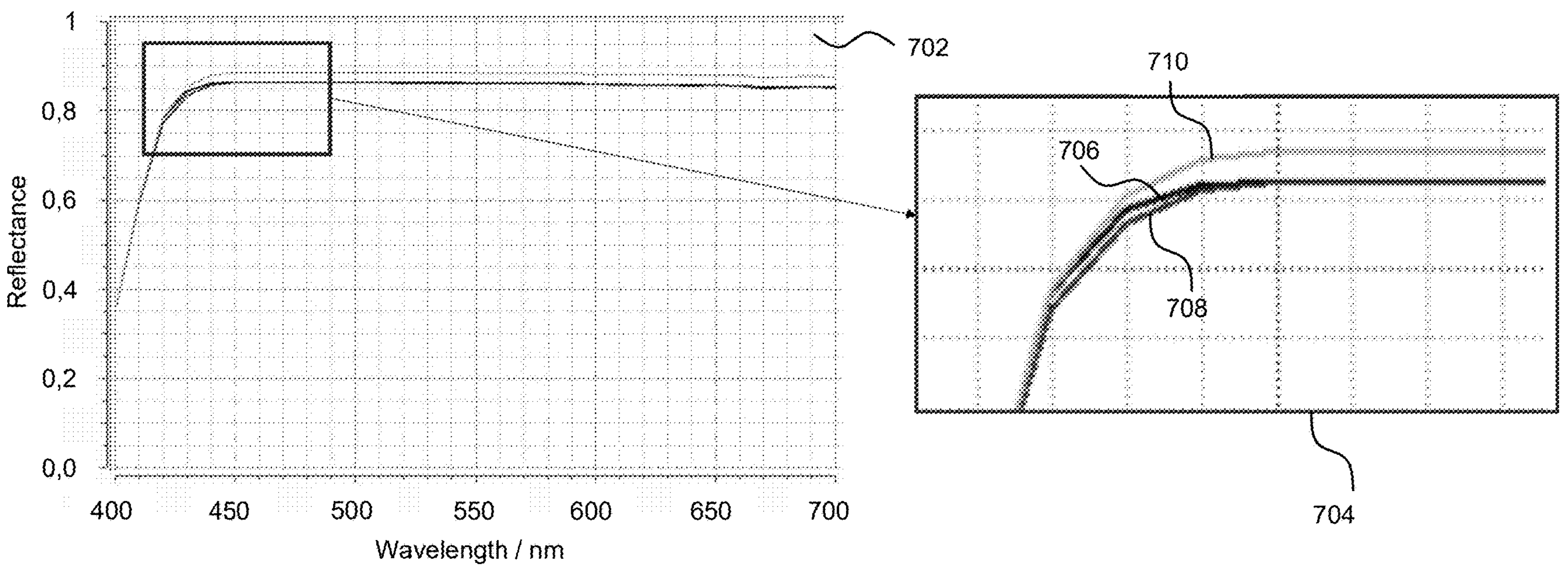
FIG. 7 illustrates a graph containing measured reflectance spectra of the reference coating and the adjusted sample coating as well as the predicted reflectance spectra (top), the color data for the reference coating, adjusted sample coating and predicted sample coating (middle) and the adjusted sample colorant formulation (bottom) determined using the method described in EP 2149038 B1

FIG. 7 illustrates a graph 702 containing measured reflectance spectra of the reference coating and the adjusted sample coating as well as the predicted reflectance spectra (top), the color data for the reference coating 706', adjusted sample coating 710' and predicted sample coating 708' (middle) and the adjusted sample coating formulation 714 (bottom) determined using the method described in EP 2149038 B1. Part of the graph 702 has been expanded 704 to illustrate the deviations between the measured reflectance spectra of the reference coating 706, the measured reflectance spectra of the adjusted sample coating 710 and the predicted reflectance spectra of the adjusted sample coating 708. The deviation in the reflectance spectra between the reference coating 706 and the adjusted sample coating 710 is also reflected in the color data 712. The deviation is due to the fact that the colorant strength of the black tinting paste was not adjusted during the determining the adjusted sample coating formulation but was assumed to be 100%. Since the adjusted sample coating formulation is too light, the colorant strength of the black tinting paste used to prepare the sample coating formulation must be less than 100%. A limitation of this method of the state of the art is that the optical properties of colorants are not constant over time. Real colorants are affected by a systematical bias which is caused by changes of the optical properties of colorants (in particular by changes of colorant strength characteristics) in comparison to the "reference" colorants, which will propagate into the adjusted formulation. Depending on the scale of this bias and the scale of the residual color difference the color adjustment results can be significantly inaccurate as demonstrated in FIG. 7.

Figure 8:
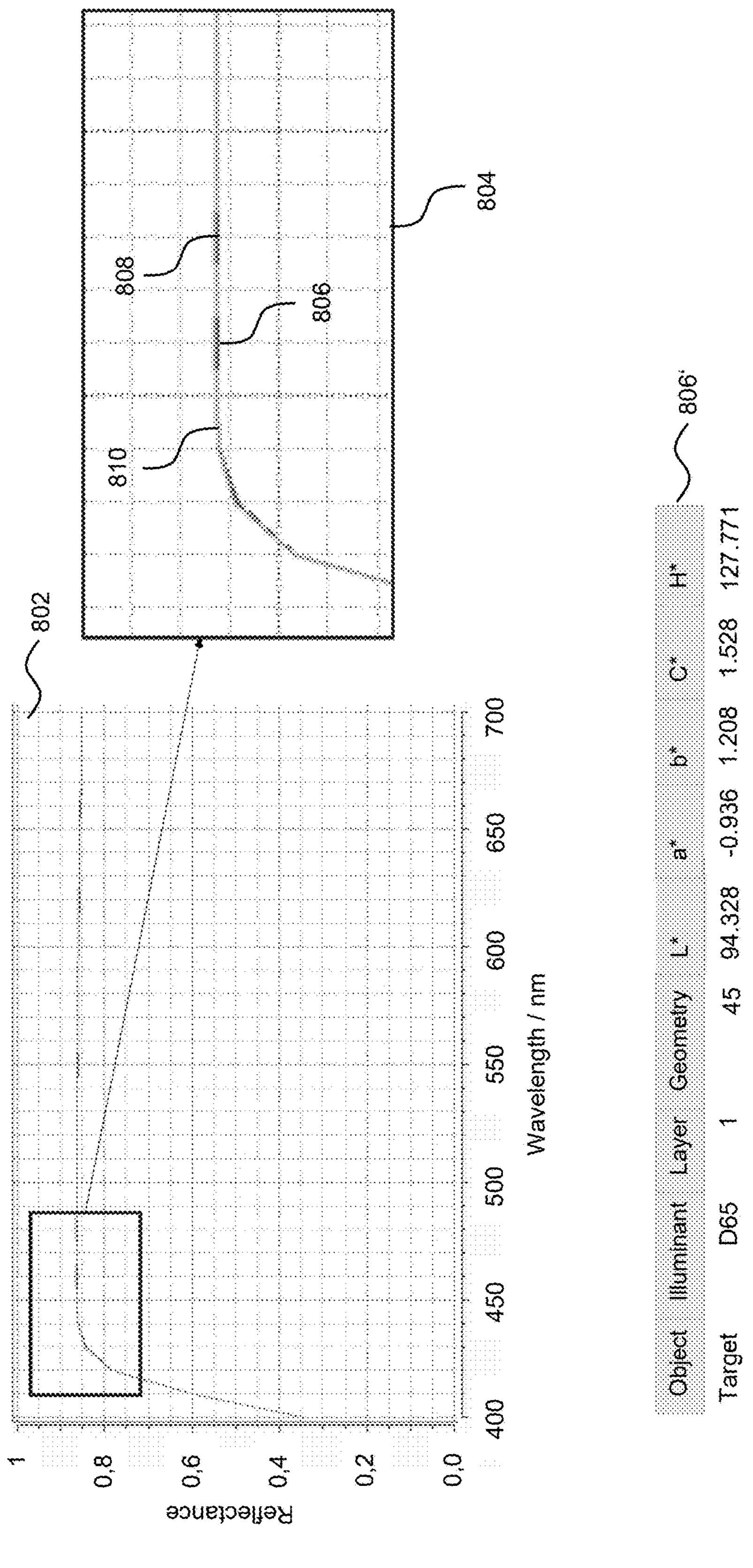
FIG. 8 illustrates a graph containing measured reflectance spectra of the reference coating and the predicted reflectance spectra (top), the color data for the reference coating, adjusted sample coating and predicted sample coating (middle) and the adjusted sample coating formulation (bottom) determined using the inventive method

FIG. 8 illustrates a graph 802 containing measured reflectance spectra of the reference coating and the predicted reflectance spectra (top), the color data for the reference coating 806', adjusted sample coating 810' and predicted sample coating 808' (middle) and the adjusted sample coating formulation 814 (bottom) determined using the inventive method, such as method 300 described in relation to FIG. 3. Part of the graph 802 has been expanded 804 to illustrate the no deviations between the measured reflectance spectra of the reference coating 806, the measured reflectance spectra of the adjusted sample coating 810 and the predicted reflectance spectra of the adjusted sample coating 808 are present. The higher accuracy of the inventive method compared to the results shown in FIG. 7 is due to considering the colorant strength of the black tinting paste used to formulate the sample coating formulation, which is less than 100% as compared to the colorant strength of the black tinting paste used to prepare the reference coting formulation. In summary, the inventive color adjustment method allows to achieve accurate adjusted sample formulations irrespective of the colorant strength of the individual color components used to prepare the reference coating formulation and the sample coating formulation and thus reduces the number of color adjustments necessary to achieve the desired color match.

The invention claimed is:

1. A computer-implemented method for determining an adjusted sample coating formulation to match a color of a reference coating, said method comprising:

(i) providing to a computer processor via a communication interface a digital representation of a sample coating containing color data of the sample coating and the sample coating formulation, a digital representation of the reference coating containing color data of the reference coating, a digital representation of individual color components containing optical data of individual color components, and a physical model configured to predict a color of the sample coating by using as input parameters the sample coating formulation and optical data of individual color components;

(ii) determining—with the computer processor—a color difference between the provided color data of the sample coating and the provided color data of reference coating;

(iii) determining—with the computer processor—a model bias of the provided physical model by predicting color data of the sample coating based on the digital representation of the sample coating, the digital representation of individual color components and the physical model provided in step (i), and determining the color difference between the provided color data of the sample coating and the predicted color data of the sample coating;

(iv) minimizing—with the computer processor—the model bias determined in step (iii) by adapting the provided optical data of at least part of the individual color components present in the sample coating formulation;

(v) determining—with the computer processor—a residual model bias by determining the color difference between the provided color data of the sample coating and the predicted color data using the optical data adapted in step (iv);

(vi) calculating—with the computer processor—an adjusted sample coating formulation based on the color difference determined in step (ii), the adapted optical data of individual color components obtained in step (iv), the residual model bias determined in step (v) and the provided physical model; and (vii) providing the calculated adjusted sample coating formulation via a communication interface.

2. The method according to claim 1, wherein the digital representation of the sample coating further comprises data being indicative of the sample coating, a layer structure of the sample coating, instructions to prepare the sample coating formulation(s), a price or a combination thereof.

3. The method according to claim 1, wherein the digital representation of the reference coating further comprises data being indicative of the reference coating, the layer structure of the reference coating, the formulation associated with the reference coating, instructions to prepare the reference coating formulation(s), the price or a combination thereof.

4. The method according to claim 1, wherein the color data includes reflectance data, color space data, CIEL*a*b* values or CIEL*C*h* values, gloss data, texture parameters, sparkle characteristics and/or coarseness characteristics, or a combination thereof.

5. The method according to claim 1, wherein the optical data of individual color components includes optical constants of the individual color components.

6. The method according to claim 1, wherein the color of the sample coating is predicted in step (iii) using the sample coating formulation and the optical data of the individual color components present within the sample coating formulation as input parameters for the provided physical model.

7. The method according to claim 1, wherein minimizing the model bias determined in step (iii) includes providing a numerical method configured to adapt the optical data of at least part of the individual color components present in the sample coating formulation by minimizing a given cost function starting from the optical data provided in step (i), and adapting the optical data of at least part of the individual color components present in the sample coating formulation using the provided numerical method and the provided physical model by comparing a recursively predicted color data of the sample coating obtained with the provided physical model with the provided color data of the sample coating until the cost function falls below a given threshold value or until the number of iterations reaches a predefined limit.

8. The method according to claim 7, wherein adapting the optical data of at least part of the individual color components present in the sample coating formulation includes applying a scaling function to said optical data.

9. The method according to claim 8, wherein the scaling function includes a linear scaling function of formula (1)

$$OC_{i,j}^{adapted} = sf_{i,j} * OC_{i,j} \tag{1}$$

wherein $OC_{i,j}$ refers to the optical data of an individual color component contained in the sample coating formulation, $sf_{i,j}$ refers to the scaling factor used to scale $OC_{i,j}$, $$OC_{i,j}^{adapted}$$

refers to the adapted optical data of an individual color component contained in the sample coating formulation, i refers to the index of the optical constants used for each individual color component as parameter in the physical model and ranges from 1 to n, and j refers to the index of individual color components contained in the sample coating formulation and ranges from 1 to m.

10. The method according to claim 9, wherein the same scaling factor $sf_{i,j}$ is used for all wavelength dependent optical data of the individual color components.

11. The method according to claim 1, wherein calculating a modified sample coating formulation includes providing a numerical method configured to adjust a concentration of at least one individual color component present in the sample coating formulation by minimizing a given cost function starting from the concentrations of the individual color components contained in the provided digital representation of the sample coating, and adjusting the concentration of at least one individual color component present in the sample coating formulation using the provided numerical method, the adapted optical data obtained in step (iv), the residual model bias and the provided physical model by comparing the recursively predicted color data of the recursively adjusted formulation of the sample coating with the provided color data of the reference coating until the color difference falls below a given threshold value or until the number of iterations reaches a predefined limit.

12. A computing apparatus for determining an adjusted sample coating formulation to match the color of a reference coating, said system comprising:

a communication interface for providing a digital representation of the sample coating containing color data of the sample coating and the sample coating formulation, a digital representation of the reference coating containing color data of the reference coating, a digital representation of individual color components containing optical data of individual color components, and a physical model configured to predict the color of the sample coating by using as input parameters the sample coating formulation and optical data of individual color components; and a processing module in communication with the communication interface, the processing module comprising at least one computer processor; and a memory storing instructions that, when executed by the processing module, configure the computing apparatus to perform the steps of the computer implemented method according to claim 1.

13. A non-transitory computer-readable storage medium, the computer-readable storage medium including instructions that when executed by a computing apparatus, cause said computing apparatus to perform the steps according to the method of claim 1, said computing apparatus comprising:

a communication interface for providing a digital representation of the sample coating containing color data of the sample coating and the sample coating formulation, a digital representation of the reference coating containing color data of the reference coating, a digital representation of individual color components containing optical data of individual color components, and a physical model configured to predict the color of the sample coating by using as input parameters the sample coating formulation and optical data of individual color components; and a processing module in communication with the communication interface, the processing module comprising at least one computer processor; and a memory storing instructions that, when executed by the processing module, configure the computing apparatus to perform the steps of the computer implemented method.

14. A color adjustment process comprising the method of claim 1.

15. A client device for determining an adjusted sample coating formulation to match the color of a reference coating at a server device, wherein the client device is configured to provide a digital representation of the sample coating containing color data of the sample coating and the sample coating formulation, a digital representation of the reference coating containing color data of the reference coating, and a digital representation of individual color components containing optical data of individual color components to a server device and wherein the server device is a computing apparatus of claim 12.

16. A method of using the computing apparatus of claim 12, the method comprising using the computing apparatus in a color adjustment process.

17. The method according to claim 1, wherein the optical data of individual color components includes wavelength dependent scattering and absorption properties of the individual color components.

18. The method according to claim 1, wherein the color of the sample coating is predicted in step (iii) using the sample coating formulation and the optical constants of the individual color components present within the sample coating formulation as input parameters for the provided physical model.

19. The method according to claim 8, wherein the scaling function includes a linear scaling function of formula (1)

$$OC_{i,j}^{adapted} = sf_{i,j} * OC_{i,j} \tag{1}$$

wherein $OC_{i,j}$ refers to the optical constants-of an individual color component contained in the sample coating formulation, $sf_{i,j}$ refers to the scaling factor used to scale $OC_{i,j}$, $$OC_{i,j}^{adapted}$$

refers to the adapted optical constants of an individual color component contained in the sample coating formulation, i refers to the index of the optical constants used for each individual color component as parameter in the physical model and ranges from 1 to n, and j refers to the index of individual color components contained in the sample coating formulation and ranges from 1 to m.

20. The method according to claim 9, wherein the same scaling factor $sf_{i,j}$ is used for all wavelength dependent optical constants of the individual color components.

* * * * *